US012508310B2

(12) United States Patent
Filaci et al.

(10) Patent No.: US 12,508,310 B2
(45) Date of Patent: Dec. 30, 2025

(54) NANOPARTICLES FOR USE IN REDIRECTION AGAINST THE TUMOUR OF A NON-TUMOUR SPECIFIC IMMUNE RESPONSE, BASED ON A PRE-EXISTING IMMUNITY

(71) Applicants: PHARMAEXCEED S.R.L., Pavia (IT); Gilberto Filaci, Genoa (IT); Daniela Fenoglio, Genoa (IT); Francesca Ferrera, Genoa (IT)

(72) Inventors: Gilberto Filaci, Genoa (IT); Daniela Fenoglio, Genoa (IT); Francesca Ferrera, Genoa (IT); Maria Luisa Torre, Pavia (IT); Elia Bari, San Nazzaro Val Cavargna (IT); Sara Perteghella, Cura Carpignano (IT)

(73) Assignees: PHARMAEXCEED S.R.L., Pavia (IT), part interest; Gilberto Filaci, Genoa (IT), part interest; Daniela Fenoglio, Genoa (IT), part interest; Francesca Ferrera, Genoa (IT), part interest ( * ) Notice: Subject to any disclaimer, the term of this patent is extended or adjusted under 35 U.S.C. 154(b) by 1052 days.

(21) Appl. No.: 17/616,207

(22) PCT Filed: Jun. 10, 2020

(86) PCT No.: PCT/IB2020/055456
§ 371 (c)(1),
(2) Date: Dec. 3, 2021

(87) PCT Pub. No.: WO2020/250153
PCT Pub. Date: Dec. 17, 2020

(65) Prior Publication Data
US 2022/0249656 A1    Aug. 11, 2022

(30) Foreign Application Priority Data

Jun. 11, 2019   (IT) ..................... 1020219000008658

(51) Int. Cl.
| | | |
|---|---|---|
| A61K 39/29 | (2006.01) | |
| A61K 9/16 | (2006.01) | |
| A61K 39/00 | (2006.01) | |
| A61K 39/05 | (2006.01) | |
| A61K 39/08 | (2006.01) | |
| A61K 39/095 | (2006.01) | |
| A61K 39/12 | (2006.01) | |
| A61K 39/39 | (2006.01) | |
| A61K 40/11 | (2025.01) | |
| A61K 40/42 | (2025.01) | |
| A61P 35/00 | (2006.01) | |

(52) U.S. Cl.
CPC .......... *A61K 39/292* (2013.01); *A61K 9/1623* (2013.01); *A61K 39/05* (2013.01); *A61K 39/08* (2013.01); *A61K 39/095* (2013.01); *A61K 39/12* (2013.01); *A61K 39/39* (2013.01); *A61K 40/11* (2025.01); *A61K 40/42* (2025.01); *A61P 35/00* (2018.01); *A61K 2039/55561* (2013.01); *A61K 2039/6087* (2013.01); *A61K 2039/6093* (2013.01)

(58) Field of Classification Search
None
See application file for complete search history.

(56) References Cited

FOREIGN PATENT DOCUMENTS

| | | |
|---|---|---|
| WO | 2013034741 A1 | 3/2013 |
| WO | 2016176164 A1 | 11/2016 |

OTHER PUBLICATIONS

Chan (BME Front. 2023:4:Article 0016).*
Crivelli B. et al., "Silk nanoparticles: from inert supports to bioactive natural carriers for drug delivery", Soft Matter Jan. 24, 2018, vol. 14, No. 4, pp. 546-557.
Gutjahr A. et al., "Biodegradable polymeric nanoparticles-based vaccine adjuvants for lymph nodes targeting", Vaccines, Oct. 12, 2016, vol. 4, No. 34, pp. 1-16.
Jinyu H. et al., "Polymer-based nanomaterials and applications for vaccines and drugs", Polymers Jan. 2, 92018, vol. 10, No. 31, pp. 1-14.
Mohsen M.O. et al., "Vaccination with nanoparticles combined with micro-adjuvants protects against cancer", Journal for Immunotherapy of Cancer, Apr. 26, 2019, vol. 7, No. 1, Apr. 26, 2019, pp. 114.
Search Report and Written Opinion of PCT/IB2020/055456 of Oct. 9, 2020.
Communication from European Patent Office dated Apr. 11, 2025 in connection with counterpart European Patent Application No. 20737281.4-1111.
Sudheesh M S et al., "Nanoparticle-based immunopotentiation via tetanus toxoid-loaded gelatin and aminated gelatin nanoparticles", Drug Delivery, vol. 18, No. 5, Feb. 25, 2011, pp. 320-330.

* cited by examiner

*Primary Examiner* — Brian Gangle
(74) *Attorney, Agent, or Firm* — Silvia Salvadori, P.C.; Silvia Salvadori

(57) ABSTRACT

The present patent application relates to nanoparticles for the delivery and targeting of a non-tumour-specific antigen in cancer cells, comprising a matrix support based on a biocompatible material, the non-tumour-specific antigen, and an adjuvant, for use in recalling, in cancer patients who have a specific immunity for the non-tumour- specific antigen pre-existing to the tumour pathology, the immune response specific to the non-tumour-specific antigen against the cancer cells. A further object of the application is anti-tumour pharmaceutical formulations comprising nanoparticles and kits comprising the aforementioned anti-tumour pharmaceutical formulations in combination with traditional anti-tumour vaccines.

13 Claims, 6 Drawing Sheets

Specification includes a Sequence Listing.

NANOPARTICLES FOR USE IN REDIRECTION AGAINST THE TUMOUR OF A NON-TUMOUR SPECIFIC IMMUNE RESPONSE, BASED ON A PRE-EXISTING IMMUNITY

This application is a U.S. national stage of PCT/IB2020/055456 filed 10 Jun. 2020, which claims priority to and the benefit of Italian Application No. 102019000008658 filed on 11 Jun. 2019, the contents of which are incorporated herein by reference in their entireties.

Sequence listing ASCII file P06163 PCT—Sequence listing (PatentIn)_ST25.txt created on Dec. 1, 2021 and of size of 3000 bytes is incorporated herein by reference.

FIELD OF THE INVENTION

The patent application relates to the use of nanoparticles for use in anti-tumour treatment.

STATE OF THE ART

Studies conducted over the past forty years clearly demonstrate that the immune system has the ability to modulate tumour growth and tumour differentiation (Schreiber et al. 2011, Cancer Immunoediting: Integrating Immunity's Roles in Cancer Suppression and Promotion Science 331, 1565-1570). This control occurs through the recognition of tumour-associated antigens (TAAs) expressed by cancer cells. In fact, although the cancer cells are endogenous to the host, there is no immunological tolerance for TAAs.

TAAs belong to several antigen categories: a) differentiation antigens (such as melanocyte differentiation antigen); b) mutational antigens; c) over-expressed cell antigens (such as HER-2-human epidermal growth factor receptor 2-); d) viral antigens (such as human papilloma virus proteins); e) cancer-testicle antigens (CT antigens), expressed in germ cells of the testicle or ovaries, silent in normal somatic cells (such as MAGE and NY-ESO1, for example) (Cheever et al. 2009. The Prioritization of Cancer Antigens: A National Cancer Institute Pilot Project for the Acceleration of Translational Research Clin. Cancer Res. 15, 5323).

Immune cells generate an immune response to the tumour through TAA recognition, defining a tumour/immune system relationship that may benefit either party with different resolutions: A) tumour elimination; B) balance between healthy tissues and the tumour; C) immune invisibility of the tumour (Schreiber et al. 2011, Cancer Immunoediting: Integrating Immunity's Roles in Cancer Suppression and Promotion Science 331, 1565-1570). The clinical result will be positive in cases (A) and (B), but not in case (C).

Immunotherapy aims to shift the tumour/immune system balance to the benefit of the latter, in order to prevent the above scenario (C) from occurring.

Such shift can be controlled differently, through two strategies: 1) enhancing the response of the immune effectors to the tumour; 2) balancing the regulatory mechanisms and cells that interfere with the response of the immune effectors.

With the use of tumour vaccines, the enhancement of the anti-tumour immune response is currently achieved, as per strategy 1 (Schreiber et al. 2011, Cancer Immunoediting: Integrating Immunity's Roles in Cancer Suppression and Promotion Science 331, 1565-1570).

In recent years, hundreds of tumour vaccines and vaccine protocols have been developed and tested clinically. Although there are signs of clinical efficacy, such as for the case of Sipuleucel-T, an approved vaccine for the treatment of advanced prostate cancer (Small et al 2006. Placebo-controlled phase III trial of immunologic therapy with sipuleucel-T (APC8015) in patients with metastatic, asymptomatic hormone refractory prostate cancer. J Clin Oncol. 24, 3089), the overall rate of clinical efficacy of tumour vaccines is low (Rosemberg et al. 2004. Immunotherapy cancer: moving beyond current vaccines. Nat Med. 10, 909).

With time, the scientific world is slowly understanding the reasons for this lack of efficacy; firstly, tumour antigens are endogenous molecules, towards which there is a certain degree of immune tolerance. In addition, the tumour can induce an under-expression of the immunogenic antigen, thereby preventing immune system attacks. Finally, the tumour vaccination protocols conducted so far have not taken into account the highly immuno-suppressive environment characteristic of tumours, linked to the expression of inhibitory checkpoints and the abundance of regulatory cells.

Recently, the genomic approach to cancer treatment has showed the presence of tumour neoantigens, linked to single tumour-specific mutations. Since these neoantigens are not subject to thymic selection, the body does not develop an immune tolerance towards them. This makes them more immunogenic than traditional tumour antigens, making them interesting targets for vaccines against cancer. (Lee et al. 2018. Update on Tumor Neoantigens and Their Utility: Why It Is Good to Be Different. Trends Immunol. 39, 536). However, tumour neoantigens are poorly shared by cancer patients and are not always presented by the human leukocyte antigen (HLA) system (Rammensee et al. 2013. HLA ligand tumor antigen discovery for personalized vaccine approach. Expert Rev Vaccines. 12, 1211). It is therefore unclear how to reconcile the need to detect highly immunogenic tumour antigens with the opportunity for their broad expression in cancer patients.

Despite the advantages introduced by the use of tumour vaccines, there are several factors that reduce the efficacy of therapy, i.e., lack of immune stimulation, in vivo instability, high toxicity, multiple administrations (Aikins et al. 2017. Vaccine nanoparticles for protection against HIV infection. Nanomedicine 12:673-682).

Based on the above, a tumour vaccine must have the following characteristics to be effective: first, the vaccine must lead to a high expression of a tumour-specific antigen; second, the tumour antigen must be expressed in a highly immunogenic environment.

Nanotechnologies could be used to solve some of these problems; nanoparticles have the ability to effectively control drug release and protect it from in vivo degradation. By virtue of the dimensional similarity between nanoparticles and pathogens, the former are capable of appropriately stimulating the immune system, both with regard to tumour and cellular immunity.

Advantages related to the use of nanoparticle-borne vaccines include, for example, improved blood flow stability, ensuring a longer half-life; improved stimulation of the immune system, which does not require repeated doses; no need to maintain cold chain continuity prior to product use; the possibility of actively directing nanoparticles towards a selective target (e.g., by means of functionalization of the nanoparticles with cyto-selective peptides) (Hayat et al. 2019. miR15a5p suppresses inflammation and fibrosis of peritoneal mesothelial cells induced by peritoneal dialysis via targeting VEGFA. 234, 7659-9878).

Nanoparticles can also be readily internalized by cells and metabolized into the cytoplasm, allowing the release of the immunogen intracellularly. In this context silk fibroin emerges as a biocompatible, biodegradable natural polymer that possesses adequate mechanical properties and therapeutic retention at the site of interest (Perteghella et al. 2017. Stem cell-extracellular vesicles as drug delivery systems: new frontiers for silk/curcumin nanoparticles. Int. J. Pharm. 520: 86-97; Crivelli et al 2018. Silk nanoparticles: from inert supports to bioactive natural carriers for drug delivery. Soft Matter 14: 546-557).

There are many examples, in the state of the art, of the use of nanotechnologies in the realization of tumour vaccines:

Mohsen et al. formulated a nanoparticle vaccine that employs a traditional vaccination strategy: the authors' nanoparticles aim to stimulate the immune system's response, submitting to its sieve an associated tumour antigen (lymphocyte choriomengitis virus glycoprotein peptide 33, LCMV), with the aim of inducing the construction of a selective immunity for the tumour expressing this antigen (by transfection) (Mohsen M O, Heath M D, Cabral-Miranda G, et al. Vaccination with nanoparticles combined with micro-adjuvants protects against cancer. J Immunother Cancer. 2019; 7(1):114). The nanoparticles, obtained with the cucumber mosaic virus coating protein, incorporate the universal epitope TT830-843 of the Tetanus toxoid (CuMVTT-VLPs) as an adjuvant, as it is capable of inducing a T helper response to support the immunization induced by the tumour-associated antigen (p33); in fact, the proposed tumour target (melanoma B16-F1O) expresses this antigen, since it was previously transfected with the p33 epitope derived from Lymphocyte Choriomeningitis Virus. Therefore, this system is a traditional model of active immunization (vaccination) against a tumour-associated antigen, in which the tetanus toxoid performs an adjuvant action (pro-inflammatory accompanying); the tetanus toxoid therefore does not perform any direct action in the specific cytolytic anti-tumour response, as it does not represent the target of such response. In addition, the anti-tumour effect results from the induction of a new immune response (not pre-existing in the body) directed towards a tumour-associated antigen. In fact, the proposed nanoparticles are intended to be internalized by the cells of the immune system (not by the tumour, as in the invention object of the present application) to induce specific immunity; furthermore, the nanoparticles described by Mohsen et al. have no direct clinical application, but are simply an animal model, since patients' tumours do not spontaneously express the p33 epitope.

Similarly, international patent application WO2013/034741 A1 discloses a traditional type vaccine, for prophylaxis and tumour treatment; again, the nanoparticles are intended for internalization by the immune system (e.g., by dendritic cells—page 18, lines 5-13). The vaccine comprises nanoparticles in metal or semiconductor material, coupled to one or more ligands. At least one such ligand comprises an epitope from a lung tumour-associated antigen (TAA), neoplastic target of the vaccine in question. The vaccine formulations described in the application may contain auxiliary substances, such as additional antigens against which the immune system has already generated a strong immune response (e.g., tetanus toxoid, bacterial toxins, lipid A derivatives and lipopolysaccharides); such additional antigens are intended to enhance the immune system response, stimulated by nanoparticles. Such additional antigens again act as adjuvants against an immune neo-response (not pre-existing in the body) directed towards a tumour-associated antigen. In the absence of the tumour-associated antigen (due to the under-modulation of its expression, a frequent phenomenon in tumours), or in the absence of the induction of an efficient response to this tumour-associated antigen (which is very common in neoplastic subjects due to immuno-regulatory phenomena typical of the tumour micro-environment) the effectiveness of the system is nullified.

A further example of use is offered by Gao et al. who developed a nanovaccine for patient tumour immunization by means of the activation of dendritic cells (DCs), so as to enhance the T-lymphocyte mediated immune response against the cancer cells (Gao et al. 2019. Dendritic cell targeting peptide-based nanovaccines for enhanced cancer immunotherapy. ACS Applied Bio Materials. DOI: 10.1021/acsabm.8b00811).

The DCs belong to so-called antigen presenting cells (APCs), which participate in the induction of acquired immunity by capturing and processing antigens to present them to the T lymphocytes.

The vaccine described in the publication by Gao et al. consists of mesoporous silica nanoparticles (MSN), derivatized with a TY peptide (author identification), which allows the nanoparticles to be selectively internalized by the dendritic cells (page B, right column, last paragraph).

The nanoparticles are loaded with ovalbumin protein (OVA), used as a model antigen, and CpG, as an adjuvant to the immune response.

The nanoparticles were tested
for their immunizing capacity in murine subjects (C57BL/J6) (page C, right column, chapter "Animal Immunization and ex Vivo CTL Priming");
for their anti-tumour therapeutic effects in the same murine subjects C57BL/J6 to whom melanoma cells transfected with ovalbumin (B16-OVA) were administered (page C, left column, last paragraph of the chapter on "Materials, Cells and Mice"; page C, right column, chapter on "Tumor challenge").

The results regarding the immunizing capacities of the nanoparticles indicate that the MSN-TY/OVA/CpG nanoparticles can significantly promote T lymphocyte proliferation and immune response (page L, left column, penultimate paragraph). The authors point out that these results are in line with what was previously verified for nanoparticle systems for promoting antigen uptake (page L, right column, first paragraph).

Following administration of MSN-TY/OVA/CpG nanoparticles in the tumour model B16-OVA, ovalbumin-specific CD8$^+$ T lymphocyte activation was recorded in both the tumour and in the lymph nodes.

The study conducted by these researchers follows a traditional vaccination strategy, in which the subject is vaccinated against an antigen already present on the pathogen (in this case the neoplastic cell transfected with OVA acting as a tumour-associated antigen): therefore, the aim is to induce a neo-response towards the tumour-associated antigen. Similar to the strategy adopted by Mohsen et al., the proposed nanoparticles, containing ovalbumin and intended to be internalized by cells of the immune system to induce specific immunity, have no direct clinical application, because under spontaneous pathological conditions, cancer cells never express ovalbumin epitopes.

In view of the limitations of efficacy of the tumour vaccines in the known art, mainly related to the near impossibility of inducing a new-onset immune response against an antigen spontaneously expressed by the tumour (due to the powerful immune-evasion mechanisms adopted by tumours), there is a need to identify a different strategy for the immunization and treatment of cancer patients.

SUMMARY OF THE INVENTION

The Applicants have developed nanoparticles delivering a non-tumour-specific antigen, for use in targeting an immune response in a cancer patient—immune to said non-tumour-specific antigen prior to the onset of the cancer pathology—against their own tumour; the nanoparticles of the invention thus solve the efficacy problems detected in the anti-tumour vaccines of the known art.

An object of the present invention is therefore nanoparticles for the delivery of an antigen in cancer cells, comprising:

matrix support based on biocompatible material in which the biocompatible material is selected from the group consisting of natural polymers, selected from the group consisting of hyaluronic acid, agar, alginate, starch, cellulose and derivatives thereof, chitosan, collagen, dextrins, fibroin, gelatine, pectin, pullulan, and combinations thereof;

synthetic polymers, selected from the group consisting of polycaprolactone, polyethylene amine, poly-lactic-co-glycolic acid and combinations thereof;

and combinations thereof;

the antigen, which is a non-tumour-specific antigen an adjuvant suitable for generating a greater immune response with respect to the non-tumour-specific antigen alone, for use in recalling, in cancer patients who have a specific immunity for the non-tumour-specific antigen pre-existing to the tumour pathology, the immune response specific to the non-tumour-specific antigen, against the cancer cells.

A further object of the present invention is anti-tumour pharmaceutical formulations comprising the nanoparticles for the above use, in combination with suitable excipients and/or diluents.

Finally, the invention relates to kits comprising an anti-tumour pharmaceutical formulation comprising the nanoparticles for the above-mentioned use, together with an anti-tumour vaccine delivering an antigen selected from the group consisting of tumour-specific antigens (TSAs); tumour-associated antigens (TAAs) and neoantigens.

DETAILED DESCRIPTION OF THE INVENTION

Figure 1:
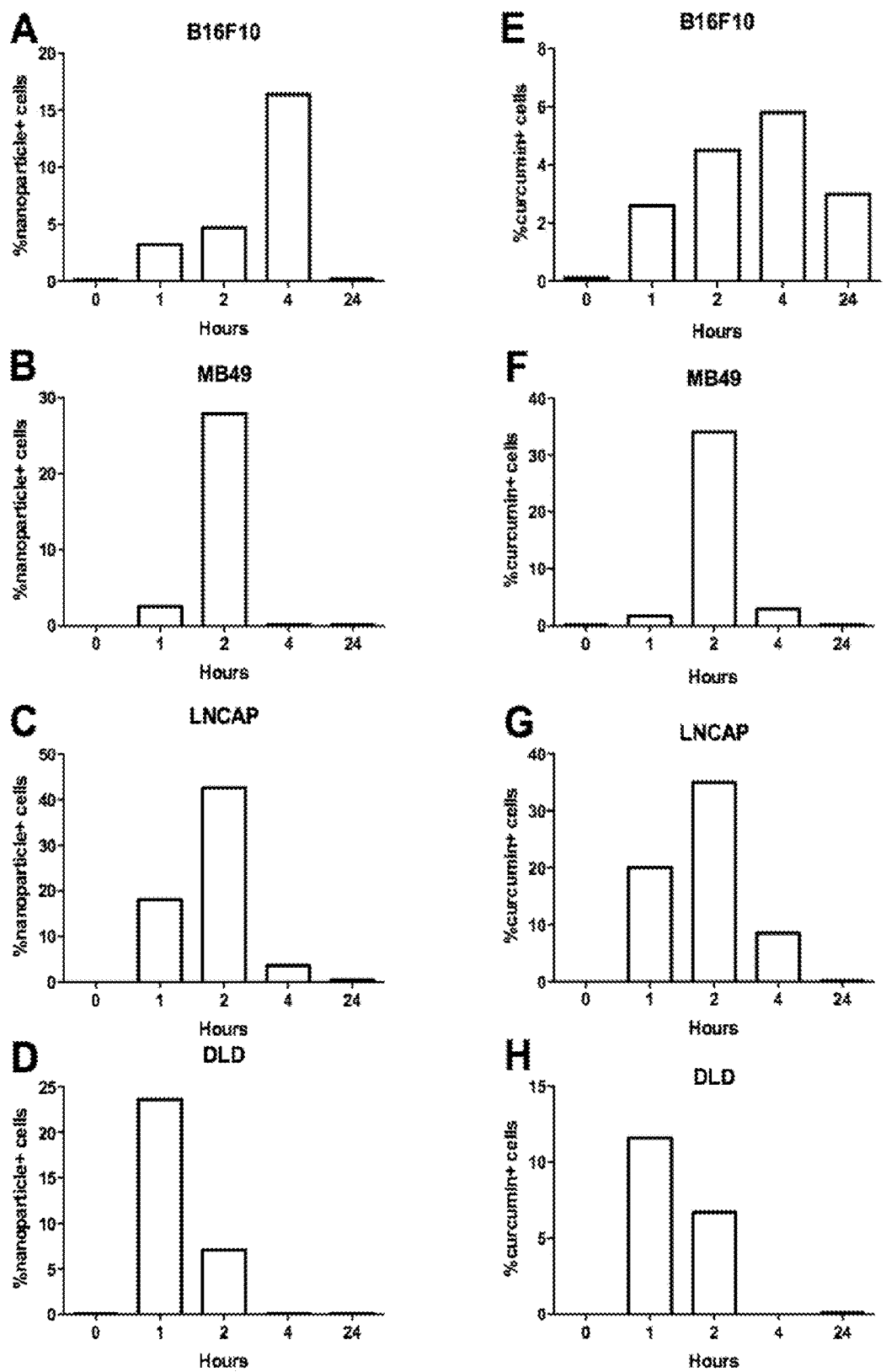
FIG. 1: Analysis of the uptake of curcumin-loaded fibroin nanoparticles by different tumour cell lines of murine (B16F10, MB49) or human (LnCap, DLD) origin. The left column (panels A-D) shows the analysis conducted on the light excitation and emission frequencies of the nanoparticles, the right column (panels E-H) shows the analysis conducted on the light excitation and emission frequencies of the curcumin.

In general, "nanoparticles" means a system consisting of at least 50% or more of particles with sizes ranging from 1 to 100 nm (EU Directive 2011/696/EU; see in particular paragraphs 8, 9 and 11), containing a supported active substance (matrix) or coated with a polymer, lipid, mineral or protein material, functional for the delivery and targeting of the active substance to the site of action.

Nanoparticulate drug delivery systems include, for example, polymer nanoparticles, ceramic nanoparticles, nanogels, magnetic nanoparticles, liposomes, and dendrimers.

Matrix Support Based on Biocompatible Material

The nanoparticles of the invention comprise a matrix support based on a biocompatible material.

For the purposes of the present invention, the term "based on" means that the nanoparticle matrix comprises one or more biocompatible materials.

"Biocompatible" material (or biomaterial) means a synthetic or natural substance that induces an appropriate host response in a given application (Consensus Development Conference 1986).

According to the definition by Black, a biomaterial is any pharmacologically inert, vital or non-vital material, natural or synthetic, that is part of or is capable of beneficially interacting with a living organism (Black, J. 1982. The Education of the Biomaterialist: Report of a Survey. Journal of Biomedical Materials Research; 16, 159-167).

Preferably, the material used for the purposes of the invention is also biodegradable, and such as to be degraded after internalization by the target cells present in the tumour micro-environment.

According to a preferred embodiment, the biocompatible and biodegradable material is a natural or synthetic polymer or a combination thereof.

Natural polymers, which are particularly preferred, are more interesting for pharmaceutical applications as they are economical, biocompatible, chemically modifiable, biodegradable and allow a simple control of the nanoparticle size and surface properties (Natural and semisynthetic polymers in pharmaceutical nanotechnology DOI: 10.1016/B978-0-12-813663-8.00002-6).

The natural polymers suitable for the realization of the nanoparticles of the invention include, for example, hyaluronic acid, agar, alginate, starch, cellulose and derivatives thereof (e.g., carboxymethylcellulose or hydroxypropylmethylcellulose), chitosan, collagen, dextrins, fibroin, gelatin, pectin, pullulan; the synthetic polymers include, for example, polycaprolactone, polyethylenediamine, polylactic acid, poly-glycolic acid, and polylactic-co-glycolic acid.

According to a preferred embodiment, the biocompatible material has a weight content between 98% and 20%, preferably between 98% and 25% of the total weight of the nanoparticles (w/w). Note that in the case of fibroin nanoparticles, the biocompatible material has a content preferably between 98% and 55%, preferably between 98% and 60%, preferably between 80% and 60%, preferably between 70% and 60%, preferably between 68% and 60% (w/w).

Even more preferably, the biocompatible material is silk fibroin, the main structural component of the silkworm cocoon fibre. For the purposes of the invention, the fibroin is preferably obtained from silkworms of the species *Bombyx mori* by degumming and subsequent dissolution, as described in the following Experimental Section.

Fibroin can be very advantageously used with a high potential for application in the medical field because it has high biocompatibility, controllable biodegradability, low toxicity and immunogenicity, potential for chemical modification and functionalization, adequate mechanical properties and therapeutic retention at the site of action (Kundu et al., 2013. Silk fibroin biomaterials for tissue regenerations. Advanced Drug Delivery Reviews. 65, 457; Mottaghitalab et al., 2015. Silk fibroin nanoparticle as a novel drug delivery system. J. Control. Release 206, 161-76; Perteghella et al., 2017. Stem cell-extracellular vesicles as drug delivery systems: New frontiers for silk/curcumin nanoparticles. Int. J. Pharm. 520: 86-97; Crivelli et al., 2018. Silk nanoparticles: from inert supports to bioactive natural carriers for drug delivery. Soft Matter 14: 546-57).

Note that the nanoparticles of the invention are site-specific controlled release systems: release of the active ingredient occurs by biodegradation of the matrix after it has reached the target site which, in the case of the invention, is the cytoplasm of the cancer cells.

In this compartment, the nanoparticle is digested and the antigen is released; this antigen is in turn digested into peptides and fragments of antigenic protein (epitopes), which are exposed on the membrane of the cancer cells. At this point, the immune system recognizes the tumour cell not as such but as exposing well-recognizable epitopes, even in a micro-environment in which the immune system is inhibited.

Internalization of Nanoparticles by Cancer Cells

The nanoparticles of the invention act as vectors of both the non-tumour-specific antigen and the adjuvant for their delivery within a cancer cell.

The nanoparticles are believed to be an effective vector for this purpose, due to their versatility in terms of particle size, surface charge, and chemical modifications. Furthermore, the idea that nanoparticles are preferably internalized by cancer cells in vivo is widespread, also by virtue of the effect of increased permeation and retention (Maeda et al. 2000. Tumour vascular permeability and the EPR effect in macromolecular therapeutics: a review. J Control Release. 65, 271 (2000) (E.P.R. Enhanced Permeation and Retention effect).

In general, note that the internalization of nanoparticles depends on several factors (Pati R, Shevtsov M, Sonawane A. Nanoparticle Vaccines Against Infectious Diseases. Front Immunol. 2018 Oct. 4; 9:2224. doi: 10.3389/fimmu.2018.02224), and in particular: 1) size: large (PLGA) particles (1, 7 and 17 μm) have reduced internalization compared to smaller ones (≤300 nm); 2) surface charge: positively charged nanoparticles are internalized to a greater extent than those that are neutral or close to neutrality, and the latter to a greater extent than those that are very negatively charged. This effect is due to the electrostatic interactions between the nanoparticle and the cell membrane which is negatively charged; 3) shape: spherically shaped gold nanoparticles are internalized to a greater extent than nanoparticles of the same size but of cubic or elongated shape; 4) hydrophobicity: hydrophobic polymer nanoparticles are internalized to a greater extent than polyethylene glycol film-coated nanoparticles (PEGylation), which reduces interaction with the cell membrane; 5) surface modifications: they may alter the specificity of binding and interaction with cells. For example, CD47 conjugation reduces internalization by phagocytosis.

Intracellular uptake of silk nanoparticles and their efficacy have been demonstrated against several cancer cells, such as for example breast cancer cells (Gupta et al. 2009. Fabrication and characterization of silk fibroin-derived curcumin nanoparticles for cancer therapy. Int. J. Nanomed. 4: 115-22; Seib et al. 2013. pH-Dependent anticancer drug release from silk nanoparticles. Adv. Healthcare Mater. 2: 1606-11.), gastric cancer cells (Wu et al. 2013. Easy preparation of paclitaxel loaded silk fibroin nanoparticles for enhanced antitumor efficacy by locoregional drug delivery. ACS Appl. Mater Interfaces 5: 12638-45) and carcinoma cells (Kundu et al. 2010. Silk fibroin nanoparticles for cellular uptake and control release. Int. J. Pharm. 388, 242-50). Furthermore, the data presented by the Applicants in the experimental section show that cancer cells of various histotypes, both murine and human, efficiently uptake silk fibroin nanoparticles (FIG. 1). Qu et al. formulated silk fibroin nanoparticles for use in anti-tumour therapy, incorporating cisplatin; in vitro experiments indicated that cisplatin-loaded particles were readily internalized by A549 lung cancer cells, transferring cisplatin thereto and inducing apoptosis. The authors also observed that the nanoparticles elicited the cytotoxic effect on cancer cells efficiently and consistently, while showing reduced efficacy on non-cancer cells. (Qu et al. 2014 Silk fibroin nanoparticles prepared by electrospray as controlled release carriers of cisplatin. Materials Science & Engineering C-Materials for Biological Applications 44, 166-174).

In other words, without wishing to be constrained to any theory, the Applicants believe that silk fibroin itself has properties that make it promote the internalization by cancer cells; the aforementioned scientific studies, as well as the in vivo therapeutic efficacy data attached to the present application, support this thesis, making silk fibroin nanoparticles the preferred vehicle for the purposes of the invention. See in particular the analyses reported in chapter 1 of the experimental section regarding the ability of the nanoparticles object of the invention to be internalized by cancer cells, and in chapter 7 regarding the ability of the nanoparticles object of the invention to direct a pre-existing immune response aimed at a non-tumour associated antigen or tumour-specific antigen in the context of the tumour microenvironment. In such analyses, tumour tissue samples, obtained from mice pre-immunized with OVA subjected to tumour challenge and treated with OVA-loaded fibroin nanoparticles, showed a higher frequency of IFN-7-positive CD4+ and CD8+ OVA-specific T lymphocytes than the corresponding tumour samples of mice pre-immunized with OVA but not treated with nanoparticles (FIG. 7), thus demonstrating an effective redirection of the immune response to the tumour, thanks to the internalization of OVA (as a non-tumour-specific antigen model) by the tumour tissue.

The internalization may also be promoted by the functionalization of nanoparticles; the functionalization may be performed with selective targeting agents towards the cancer cells (e.g., peptides, RGDs, or others as known to a person skilled in the art).

Functionalizations with Tumour-Selective Targeting Agents

The tumour targeting of nanoparticles can be achieved by the well-known EPR effect (Enhanced Permeability and Retention): due to a high vascular network permeability surrounding the tumour mass, intravenously injected nanoparticles pass through the basolateral membrane, enter the tumour and are thus retained due to the lack of effective lymphatic drainage. However, the EPR effect can be compromised by the aggregation of the nanoparticles, resulting in increased product size distribution; an effective strategy to limit this aggregation phenomenon is, for example, the functionalization of the nanoparticles with an outer layer of polyethylene glycol (PEG) or with other hydrophilic polymers.

Other functionalization strategies for the selective targeting of nanoparticles towards cancer cells are known to a person skilled in the art. Examples of functionalization suitable for the purposes of the invention are preferably selected from the group consisting of peptides; glycoproteins, such as for example transferrins for crossing the blood-brain barrier (F. C. Lam, S. W. Morton, J. Wyckoff, T. L. Vu Han, M. K. Hwang, A. Maffa, E. Balkanska-Sinclair, M. B. Yaffe, S. R. Floyd, P. T. Hammond, Enhanced efficacy of combined temozolomide and bromodomain inhibitor therapy for gliomas using targeted nanoparticles, Nat. Commun. 9 (2018)), antibodies and antibody fragments; nucleic acids; small molecules, such as folic acid for folate receptors (F. Porta, G. E. M. Lamers, J. Morrhayim, A. Chatzopoulou, M. Schaaf, H. den Dulk, C. Backendorf, J. I. Zink, A. Kros, Folic acid-modified mesoporous silica nanoparticles for cellular and nuclear targeted drug delivery, Adv. Healthc. Mater. 2 (2013)).

The peptides preferably include CTL1 (fibronectin targeting peptide, CGLIIQKNEC, SEQ ID NO:3); CREKA, SEQ ID NO:4 (fibrin binding peptide cysteine, arginine, glutamic acid, lysine, aspartic acid, RGD: arginine, glycine, aspartic acid); macrophage targeting peptide-M2; RGD for integrin binding; P160 targeting peptide found via phage display; chlorotoxin peptide for MMP2 (type 2 matrix metalloproteinase).

The antibodies and antibody fragments preferably include Anti-CD8a F(ab')2; HuA33 monoclonal antibody; HER2 monoclonal antibody; anti-EGFR receptor.

The nucleic acids preferably include single chain oligonucleotide-based aptamers; anti-cMet DNA aptamer; guanine-rich DNA aptamer.

Particular reference is made to Table 2 of the review of Nathan et al., of which content and citation references are incorporated herein (Nathan D. Donahue, Handan Acar, Stefan Wilhelma, Concepts of nanoparticle cellular uptake, intracellular trafficking, and kinetics in nanomedicine. Advanced Drug Delivery Reviews 143 (2019) 68-96).

Functionalization with Specific Tumour-Selective Targeting Agents for Silk Fibroin Particles Effective PEGylations of fibroin nanoparticles are reported in the literature (Totten, J. D.; Wongpinyochit, T.; Carrola, J.; Duarte, I. F.; Seib, F. P., PEGylation-Dependent Metabolic Rewiring of Macrophages with Silk Fibroin Nanoparticles. Acs Applied Materials & Interfaces 2019, 11 (16), 14515-14525; Wongpinyochit, T.; Uhlmann, P.; Urquhart, A. J.; Seib, F. P., PEGylated Silk Nanoparticles for Anticancer Drug Delivery. Biomacromolecules 2015, 16 (11), 3712-3722).

Other selective targeting agents for cancer cells are preferably selected from (the contents of the aforementioned publications are incorporated herein by reference, with particular regard to the functionalization techniques and, sometimes, ligand obtaining techniques):

cRGDfk cyclic peptide, SEQ ID NO:5; Mao et al. prepared fibroin nanoparticles conjugated with such peptide for the delivery of the anti-tumour drug 5-fluorouracil. The cRGDfk [Cyclo(-Arg-Gly-Asp-D-Phe-Lys, SEQ ID NO:5)]was conjugated to the fibroin active groups (amines and carboxyls) by reaction with carbodiimide (Mao, B.; Liu, C.; Zheng, W.; Li, X.; Ge, R.; Shen, H.; Guo, X.; Lian, Q.; Shen, X.; Li, C., Cyclic cRGDfk peptide and Chlorin e6 functionalized silk fibroin nanoparticles for targeted drug delivery and photodynamic therapy. Biomaterials 2018, 161, 306-320);

peptide SP5-52 (SVSVGMKPSPRP, SEQ ID NO:6); Mottaghitalab et al. functionalized fibroin nanoparticles with such peptide for the delivery of gentamicin in murine model lung cancer cells (Mottaghitalab, F.; Kiani, M.; Farokhi, M.; Kundu, S. C.; Reis, R. L.; Gholami, M.; Burdock, H.; Dinarvand, R.; Geramifar, P.; Beild, D.; Atyabi, F., Targeted Delivery System Based on Gemcitabine-Loaded Silk Fibroin Nanoparticles for Lung Cancer Therapy. Acs Applied Materials & Interfaces 2017, 9 (37), 31600-31611);

anti-EGFR-iRGD recombinant protein, consisting of anti-EGFR VHH (the variable domain of the heavy chain of the antibody against endothelial growth factor) fused to iRGD, a nine-unit cyclic peptide, hosting the RGD sequence (CRGDKGPDC, SEQ ID NO:7); Bian et al. made paclitaxel-loaded nanoparticles and functionalized with anti-EGFR-iRGD using a carbodiimide-mediated coupling procedure (Bian, X. Y.; Wu, P. Y.; Sha, H. Z.; Qian, H. Q.; Wang, Q.; Cheng, L.; Yang, Y.; Yang, M.; Liu, B. R., Anti-EGFR-iRGD recombinant protein conjugated silk fibroin nanoparticles for enhanced tumour targeting and antitumor efficiency. Oncotargets and Therapy 2016, 9, 3153-3162);

RGD (Arg-Gly-Asp); fibroin nanoparticles were functionalized with the RGD peptide to increase the internalization of nanoparticles by damaged intestinal cells; the linear peptide was coupled to fibroin nanoparticles using glutaraldehyde as a crosslinker (Rodriguez-Nogales, A.; Algieri, F.; De Matteis, L.; Lozano-Perez, A. A.; Garrido-Mesa, J.; Vezza, T.; de la Fuente, J. M.; Cenis, J. L.; Galvez, J.; Rodriguez-Cabezas, M. E., Intestinal anti-inflammatory effects of RGD-functionalized silk fibroin nanoparticles in trinitrobenzenesulfonic acid-induced experimental colitis in rats. International Journal of Nanomedicine 2016, 11, 5945-5958). Note that with particular reference to silk fibroin nanoparticles, these are functional for the purposes of the invention both with and without surface functionalizations.

Non-Tumour-Specific Antigen

The nanoparticles according to the invention contain:
a non-tumour-specific antigen for which the cancer subject is already immunized;
an adjuvant.

According to a preferred embodiment, the nanoparticles of the invention contain, as the only antigen, the non-tumour-specific antigen.

"Antigen" refers to an immunogenic substance capable of inducing antibody production and triggering a specific immune response, also cell-mediated, when introduced into the tissues of a subject sensitive to such antigen.

The nanoparticles according to the invention are intended for medical use (anti-tumour treatment), and in particular for targeting, in a cancer patient, an immune response against cancer cells, through the delivery in the cancer cells of a non-tumour-specific antigen for which said subject acquired specific immunity before the onset of the cancer: said non-tumour-specific antigen is delivered by the nanoparticles. In other words, the nanoparticles according to the invention have the function of directing within cancer cells a non-tumour-specific antigen for which the organism was immunized before the onset of the cancer: this in order to direct a pre-existing immune response in the subject against the cancer cells, to which an antigen for which the subject is already immune is expressed. Said non-tumour-specific antigen is delivered by the nanoparticles forming the vector. Once internalized and metabolized by the cells, the non-tumour-specific antigen allows the cells of the immune system to recognize the cancer cells.

"Non-tumour-specific antigen" means an antigen that does not belong to the class of antigens expressed by the cancer cells, comprising tumour-specific antigens (TSAs); tumour-associated antigens (TAAs) and neoantigens. In other words, "non-tumour-specific antigen" means a xenogenic antigen, unrelated to any type of cancer from an antigenic point of view.

Tumour-specific antigen means an antigen expressed solely by cancer cells.

Tumour-associated antigen means an antigen expressed in both the healthy cells and in the cancer cells of a subject; in the cancer cells this antigen is expressed in an aberrant or unregulated manner.

Neoantigen means a somatic variant of a wild-type tumour-specific antigen; neoantigens are specific for each patient.

For the purposes of the present invention, the non-tumour-specific antigen is preferably an antigen associated with robust immunity worldwide. More preferably, such non-tumour-specific antigen is selected from the antigens of mandatory vaccines recommended by the International Institutes of Health for the prevention of the spread of infectious diseases.

The antigens present in the mandatory and recommended vaccines include, for example: diphtheria toxoid (diphtheria vaccine) [UniProtKB Accession No.: Q6KE85, version 36]; tetanus toxoid (tetanus vaccine) [UniProtKB Accession No.: P04958, version 171]; HBsAg (viral hepatitis B vaccine) [UniProtKB Accession No.: Q773S4, version 116]; *Neisseria* Heparin Binding Antigen (NHBA) [UniProtKB Accession No.: M4JCT4, version 10], *Neisseria* adhesin A (NadA or gna1994) [UniProtKB Accession No.: Q8KH85, version 62] and meningococcus B factor H binding protein (fHbp) (meningococcal vaccine B or gna1870) [UniProtKB Accession No.: B2CQ00, version 42]; papillomavirus L1 proteins (HPV vaccine): HPV 6 [type 6b UniProtKB Accession No.—P69899, version 64 and type 6a UniProtKB Accession No.—P69898, version 61]; HPV 11 [UniProtKB Accession No.: P04012, version 102]; HPV 16 [UniProtKB Accession No.: Q9WLQ6, version 102]; HPV 18 [UniProtKB Accession No.: E6Y8B5, version 36]; HPV 31 [UniProtKB Accession No.: P17388, version 85]; HPV 33 [UniProtKB Accession No.: P06416, version 87]; HPV 45 [UniProtKB Accession No.: P36741, version 81]; HPV 52 [UniProtKB Accession No.: Q05138, version 84]; HPV 58 [UniProtKB Accession No.: P26535, version 85].

According to a preferred embodiment, the non-tumour-specific antigen is HBsAg.

The inventive idea underlying the use of the nanoparticles of the invention lies in adopting a strategy opposite that of state-of-the-art tumour vaccinology: instead of applying traditional vaccination protocols to the treatment of cancer, the invention exploits the antigens of traditional vaccinations to recall on the tumour an immune response which developed in the patient prior to the onset of the cancer and preferably at a young age.

Such a tumour targeting strategy follows a "Trojan horse" model, where the nanoparticles conceal an external antigen that is forced into the tumour and subsequently presented by the same.

The advantage of using known antigens, such as those of traditional vaccines, lies in being able to use a pre-existing immunity in the patient to affect the cancer cells, inducing the immune system to attack the neoplasm without the need to generate a tumour-specific immune neo-response in an environment (intra-tumoural) that is not prone to the development of new immune responses.

This strategy ensures the activation of a rooted and robust immune response, since it has been generated and consolidated in the past against highly immunogenic antigens, without the negative and regulatory influence of the tumour.

Without wishing to be constrained by any theory, the Applicant believes that such a "Trojan horse" approach can advantageously induce an early immune response through an appropriate stimulation of the immune system, involving both T and B lymphocyte activation, and thus limiting the possibility that the tumour will grow and attack other tissues.

Preferably, the nanoparticles of the invention deliver an antigen content of between 1% and 50%, more preferably between 20% and 40% by weight on the total weight of the nanoparticles (w/w).

Adjuvant

"Adjuvant" means a substance that helps support and sustain the immune response directed towards the non-tumour-specific antigen by activating the inflammatory circuits of innate immunity. The immune system can induce effector responses and tollerogenic responses. The first are those that induce inflammation associated with the production of antibodies and cytotoxic lymphocytes capable of neutralizing/destroying a pathogen; the second are responses that extinguish inflammation as well as the production of antibodies and the activity of cytotoxic lymphocytes: physiologically tolerable responses are typical of the phases in which the pathogen has been eradicated and tissue repair processes must be induced. In an anti-tumour immune response, the stimulating agent should induce the first type of response but not the second. Efficient effector responses require that the process involves the innate immunity system which will support the adoptive immunity system with its antibody and cytotoxic lymphocyte production. Adjuvants are molecules that have the ability to efficiently activate the innate immunity system and for this reason their presence is indispensable in any immune response.

The presence of the adjuvant in combination with the non-tumour-specific antigen has the advantage, therefore, of ensuring that the content of the nanoparticle supports a consistent immune response, preventing the creation of tolerance to the non-tumour-specific antigen. Therefore, the adjuvant must be able to be efficiently delivered by the nanoparticles together with the non-tumour-specific antigen.

Preferably, the adjuvant is selected from the group consisting of mineral salts, mineral oils, emulsions, liposomes, virosomes, oligonucleotides, toxins, cytokines and other adjuvants of a different nature currently being tested.

The aforementioned adjuvants act by variously activating innate immunity (Dubensky Jr et al. 2010. Adjuvants for cancer vaccines. Seminars in Immunology 22, 155; Ho et al. 2018. Adjuvants Enhancing Cross-Presentation by Dendritic Cells: The Key to More Effective Vaccines?Front Immunol. 9, 2874). In addition, novel adjuvants capable of activating innate immunity in the presence of moderate induction of inflammatory processes are being studied (Manzo et al. 2017. A new marine-derived sulfoglycolipid triggers dendritic cell activation and immune adjuvant response. Sci Rep. 7, 6286).

The adjuvants usable for the purposes of the invention include, for example, the following:
  Glucopyranosyl lipid A (GLA): active on Toll-like-receptors (TLRs)-3
  Monophosphoryl lipid A (MPL): active on TLR-4
  Flagellin: active on TLR-5;
  Imiquimod: active on TLR-7;
  Resiquimod: active on TLR-7/8;
  CpG oligonucleotides: active on TLR-9;
  Saponins (e.g., Quil-A): antigenic presentation activators.

More preferably, the adjuvant is CpG (cytosine-phosphoguanine). Purely by way of non-limiting example, commercially available CpG oligonucleotides suitable for the purposes of the invention are CpG-B ODN 1826 (Sequence ID No. 1: 5'-TCCATGACGTTCCTGACGTT-3') and CpG-B ODN 2006 (Sequence ID No. 2: 5'-TCGTCGTTTTGTCGTTTTGTCGTT-3'). The use of adjuvants as immune response enhancers is well known to the person skilled in the art and, in this sense, other adjuvants known in the art can be readily identified and adapted by the person skilled in the art for the purpose of formulating the nanoparticles of the invention.

Preferably, the nanoparticles of the invention deliver an adjuvant content of between 1% and 30%, more preferably between 3% and 20% by weight on the total weight of the nanoparticles (w/w).

Characterization of the Nanoparticles

Figure 2:
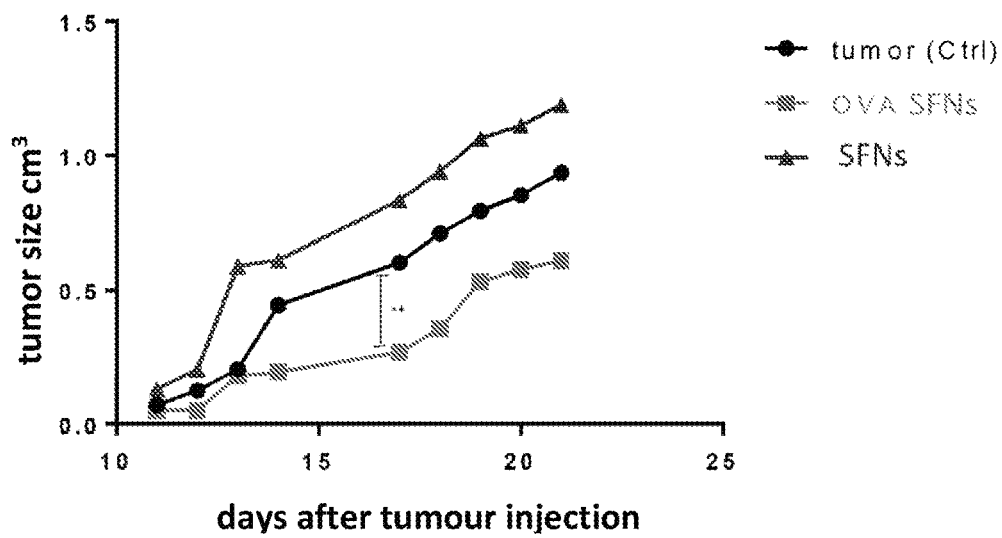
FIG. 2: Comparison of tumour size reduction trend over time (melanoma model B16F10) between Group 4, in which the mice were not treated (tumour (Ctrl)); Group 2, in which the mice were treated with silk fibroin nanoparticles loaded with Ovalbumin (OVA SFNs); Group 3 which received non-loaded particles (SFNs).

Note that the fibroin nanoparticles, according to an embodiment of the invention, are negatively charged (zeta potential); based on Coulomb's law, this feature would depose against their internalization by cells that, physiologically, are characterized by a negative surface charge (Nathan D. Donahue, Handan Acar, Stefan Wilhelma, Concepts of nanoparticle cellular uptake, intracellular trafficking, and kinetics in nanomedicine. Advanced Drug Delivery Reviews 143 (2019) 68-96—Chapter 3.2, page 75). In this sense, the experimental results obtained by the Applicants are even more surprising; as demonstrated in the experimental section, in fact, the cancer cells, regardless of the histotype, greedily uptake the nanoparticles object of the invention (FIG. 1). In addition, SFNs-OVA treatment was not only significantly effective in reducing tumour growth (FIGS. 2, 3, 4), but also demonstrated some internalization selectivity towards the cancer cells of mice pre-immunized with the OVA antigen (chapter 7 of the experimental section). The Applicants further consider that the negative surface charge of the fibroin nanoparticles contributes to their selectivity against the tumour, rather than against immune system cells, which are not the therapeutic target of the nanoparticles object of the invention; in fact, the immune system cells are generally stimulated by the presence of elements having a positive surface charge which, as such, are recognized as foreign bodies.

Preferably, the particles of the invention have a numerical size distribution comprised from 1 nm to 1,000,000 nm, preferably from 1 to 1,000 nm, preferably from 1 to 500 nm, preferably from 1 to 400 nm, preferably from 100 to 400 nm, preferably from 100 to 300 nm, even more preferably from 1 to 100 nm, measured by DLS.

According to a preferred embodiment, the silk fibroin nanoparticles are characterized by a polydispersion index (PDI)≤0.5, preferably from 0.3 to 0.5, measured with DLS.

According to a preferred embodiment, the silk fibroin nanoparticles have a zeta potential greater than −20.00 mV, preferably between −20.00 mV and −10.00 mV, preferably between −18.00 mV and −13 mV, measured with DLS (in water).

The technical advantages associated with the nanoparticles according to the invention are summarized below:
  ease of production and consequent reduction of manufacturing and purchasing costs;
  high versatility, as they are suitable for any type of cancer patient and any type of cancer, thus eliminating the need to customize the treatment according to the subject and the tumour subtype.

Pharmaceutical Nanoparticle Formulations

A further object of the present invention is pharmaceutical formulations, preferably solid or liquid, intended for the treatment of subjects suffering from cancer comprising the nanoparticles for the use described above, in combination with suitable excipients and/or diluents.

Preferably, the nanoparticle content in an anti-tumour pharmaceutical formulation according to the invention ranges from 1% to 95% by weight on the total weight of the formulation (w/w).

The product comprising nanoparticles according to the present invention can be administered to a living human or animal by any suitable route of administration, for example by direct intra-tumoural, parenteral, inhalatory, topical, ophthalmic, auricular, transcutaneous and transmucosal (such as, but not limited to, rectal, vaginal and buccal) administration.

In the case of direct intra-tumoural administration, the product is reconstituted by addition to a suitable physiological solution and administered by injection.

In the case of parenteral administration, the product is reconstituted by addition to a suitable physiological solution for injection and administered parenterally, e.g., subcutaneously or venously, by injection, drip, catheter, or intrathecal infuser.

In the case of respiratory administration, the product may be formulated as an inhalation powder or spray liquid.

In the case of ophthalmic, auricular, transcutaneous and transmucosal administration, the product may be formulated as a suspension, ointment, gel, or cream.

In the case of dermatological use, the product may be formulated as an ointment, cream, cream-gel, gel, lotion, paste, or solution/suspension for topical, ophthalmic, or irrigation application.

The product comprising nanoparticles according to the present invention can be readily packaged and sterilized (for example, but not limited to, by irradiation as described in Sakar F. et al., "Nano drug delivery systems and gamma radiation sterilization", Pharmaceutical Development and Technology), obtaining a solid pharmaceutical product for the administration of nanoparticles.

Such anti-tumour pharmaceutical formulations are preferably used as adjuvants in chemotherapy and/or radiotherapy.

More preferably, the anti-tumour pharmaceutical formulations, according to the invention, are combinable in a kit with an anti-tumour vaccine containing an antigen selected from the group consisting of tumour-associated antigen (TSA); tumour-specific antigen (TAA) and neoantigen.

Examples of anti-tumour vaccines containing a commercially TSA, TAA or neoantigen type antigen, which are experimentally available, are Sipuleucel T (Provenge®, Dendreon Corporation) and the experimental vaccine described in European Patent No. 2310044 B1, whose immunogen is telomerase.

The advantage of such a kit lies in combining a dual strategy of tumour attack, based on the targeting of a pre-existing immune response against the tumour, following the exposure of the non-tumour-specific antigen of the tumour, on the one hand, and inducing an immune response to antigens specific to the tumour, on the other.

EXAMPLES

For illustrative and non-limiting purposes, the following is an example of a kit according to the invention; note that the nanoparticle formulation included in the kit is an illustrative and non-limiting example of a pharmaceutical formulation according to the present invention.

Kit Comprising Nanoparticle Formulation and Anti-Tumour Vaccine.

The nanoparticle formulation consists of silk fibroin nanoparticles (SFN) containing HBsAg (as an immunogen) and CpG (as an adjuvant). Such SFNs are produced by adding to acetone an aqueous solution containing 1% (w/v) silk fibroin (SF), 0.5% (w/v) tetanus toxoid, and 0.1% (w/v) CpG, thereby promoting nanoparticle formation by solvent precipitation.

The nanoparticle suspensions thus obtained are dialysed (12 kDa MWCO) against deionized water for 72 hours. The aqueous suspensions thus obtained are subsequently lyophilised at a pressure of $8 \times 10^{-1}$ mbar and a temperature of $-50°$ to improve their storage over time.

Upon use the lyophilised nanoparticle formulation is brought to room temperature, weighed and aliquoted in doses (5 mg/kg body weight), re-suspended in physiological solution in a volume suitable for subsequent administration (i.e., 0.5 ml) and sonicated at 20° C. for 15 minutes.

The anti-tumour formulation may, for example, consist of a composition of 4 different hTERT-derived peptides ($hTERT_{540-548}$; $hTERT_{611-626}$; $hTERT_{672-686}$; $hTERT_{766-780}$) as described in European Patent No. 2310044 B1.

Dosing: 500 μg/peptide for intradermal injection; Aldara: a cream sachet (250 mg) applied locally containing 12.5 mg Imiquimod.

EXPERIMENTAL SECTION

Hereinafter, the nanoparticle prototype developed by the Applicants for the purpose of conducting in vivo animal experimental studies is described.

1. Cancer Cell Uptake of Fibroin Nanoparticles

Silk fibroin particles loaded with curcumin were incubated with 4 different cancer cell lines: a) B16 F10 (murine melanoma); b) MB49 (murine bladder cancer); c) DLD-1 (human colon adenocarcinoma); d) LNCap.FGC (human prostate adenocarcinoma). Cancer cell lines (25000 cells/well in 24-well plates) were grown adherently in the presence of RPMI-1640 culture medium containing 10% (v/v) fetal bovine serum at 37° C. in 5% $CO_2$. Silk fibroin nanoparticles loaded with curcumin were added to the cultures at a concentration of 200 μg/ml for 1, 2, 4 and 24 hours. Cancer cells cultured in the absence of nanoparticles were the negative control of the experiments. Upon completion of the incubations, the cancer cells were harvested by trypsinization, washed and re-suspended in 200 pl fresh culture medium. Vital 7-AAD dye (0.25 μg/sample) was added to each sample to identify the dead cells by cytofluorimetric analysis. The cell suspension was analysed by a FACS Canto II cytofluorimeter using FACS DIVA software. This analysis benefited from the fact that nanoparticles and curcumin have different light excitation and emission frequencies: in particular 515 nm (excitation) and 585 nm (emission) for nanoparticles, 488 nm (excitation) and 525 nm (emission) for curcumin, respectively. For this purpose, the analyses were conducted by means of a violet light emitting laser for the nanoparticles, and a green light emitting laser for the curcumin.

The results of the experiments, expressed in terms of percentages of live cells positive for either nanoparticles (FIG. 1, panels A-E) or curcumin (FIG. 1, panels F-J), indicate that all the cancer cell lines tested uptook the nanoparticles, although with different absorption kinetics. The fact that comparable results were observed between the nanoparticle uptake and the curcumin absorption analyses is an important intra-experimental confirmation.

2. Prototype

Ovalbumin (OVA) was selected as the antigen to deliver in the nanoparticle prototype, as a xenogenic protein in mice, unrelated to any tumour from an antigenic standpoint.

CpG ODN 1826 was selected as adjuvant.

The nanoparticles were made with silk fibroin, as a biocompatible material suitable for targeting non-tumour-specific antigens towards in vivo cancer cells.

2.1 Preparation of the Prototype Nanoparticles

Silk fibroin nanoparticles (SFNs) were obtained by desolvation from an aqueous solution of silk fibroin.

*Bombyx mori* silkworms were slit and degummed in a $Na_2CO_3$ aqueous solution (0.02 M) at 100° C. for 30 minutes; the degummed fibres were washed in distilled water and dried at room temperature.

The silk fibroin (SF) was solubilized in an LiBr solution (9.3 M) at 60° C. for 4 h; the obtained solution was dialysed against distilled water for 72 h, at room temperature, using tubes of dialysis-regenerated cellulose (3-5 kDa Molecular Weight Cut-Off).

Three different nanoparticle formulations were prepared: silk fibroin nanoparticles (SFNs); silk fibroin nanoparticles loaded with Ovalbumin (SFNs-OVA); silk fibroin nanoparticles loaded with Ovalbumin and CpG (SFNs-OVA-CpG).

SFNs: an SF solution (1.5% w/v) was added to acetone, resulting in nanoparticles being formed by solvent precipitation.

SFNs-OVA: a solution of SF (1% w/v) and OVA (0.5% w/v) was added to acetone, promoting the nanoparticle formation by solvent precipitation.

SFNs-OVA-CpG: the same procedure applied for the preparation of SFNs-OVA was adopted, starting from a solution comprising 1% (w/v) SF, 0.5% (w/v) OVA, and 0.1% (w/v) CpG.

All the nanoparticle suspensions were dialysed (12 kDa MWCO) against deionized water for 72 hours. The aqueous suspensions thus obtained were lyophilised at a pressure of $8 \times 10^{-1}$ mbar and a temperature of −50° to improve their storage overtime.

3. Characterization of the Prototype Nanoparticles
Granulometric Analysis.

The mean size, polydispersity index (PDI) and zeta potential of the nanoparticles were measured using ZetasizerNano ZS (Malvern Instruments Ltd., Worcestershire, United Kingdom). Aqueous suspensions (1 mg/ml) of SNFs, SFNs-OVA and SNFs-OVA-CpG were prepared and allowed to equilibrate overnight at 25° C. with gentle stirring. Then the nanoparticle dispersions were filtered with 0.45 μm filter and analysed. The measurements were performed in triplicate for each sample. To define the Z-potential of the nanoparticles, 1 mM KCl was added to the aqueous suspension of 1 mg/mL. Each analysis was carried out in triplicate. Table 1 shows the mean diameter, PDI and zeta potential values of each sample (mean standard deviation, n=5).

TABLE 1

| Sample | Mean diameter (nm) ± standard deviation | PDI | Zeta potential (mV) |
| --- | --- | --- | --- |
| SNFs | 69.25 ± 20 | 0.3 | −17.97 |
| SFNs-OVA | 129.4 ± 45 | 0.4 | −13.13 |
| SNFs-OVA-CpG | 362.6 ± 44 | 0.5 | −13.14 |

Chemical-Physical Characterization.

The IR spectra of the nanoparticles were obtained with FTIR Spectrum One—Perkin-Elmer spectrophotometer (Perkin-Elmer, Wellesley, MA, USA) configured with the accessory ATR MIRacle™ (Pike Technologies, WI, USA). The spectra were recorded in the spectral region ranging from 650-4000 cm$^{-1}$ with a resolution of 4 cm$^{-1}$. Each measurement was carried out in triplicate.

Differential Scanning Calorimetry (DSC) was used to measure the temperature and enthalpy values of about 3 mg of each sample using 40 μl aluminium crucibles with perforated lid, using the Mettler STARe system (Mettler Toledo, Columbus, OH, USA) equipped with DSC81$^e$ module and a cooling device to conduct analyses below room temperature (Jukabo FT 900). The method used for the DSC provides a temperature range from −10 to 400° C., with a heating rate of 10 K min$^{-1}$, under nitrogen atmosphere with 50 ml min$^{-1}$ flow. The calibration was carried out with Indio as the standard reference; the measurements were repeated in triplicate for each sample.

The FT-IR spectrum of the nanoparticles showed the presence of characteristic peaks in the spectral region of the primary amides (at about 1620 cm$^{-1}$, stretching of C=O), secondary amides (at about 1520 cm$^{-1}$, bending of N—H) and tertiary amides (at about 12030 cm$^{-1}$, for the C—N and N—H functional groups).

The spectroscopic data are supported by the DSC thermal analysis. The nanoparticles showed a typical profile of an amorphous compound with an endothermic effect around 270° C., associated with a loss of mass in the thermogravimetric curve, linked to sample decomposition.

Loading the Ovalbumin into the Nanoparticles.

The OVA loading into the nanoparticles was verified by an ELISA kit (Cloud-Clone Corp., TX, USA) according to the instructions provided by the manufacturer, on the sample of nanoparticles not subjected to any digestion treatment. The analysis was carried out on the nanoparticles dispersed in distilled water and demonstrated the presence of reactive OVA on both the surface of the SFNs-OVA (827 μg/ng nanoparticles) and on the surface of the SFNs-OVA-CpG (936 μg/ng nanoparticles)

Loading the CpG into the Nanoparticles.

The micro-analytical composition of the nanoparticles was determined by a high-resolution electronic scanning microscope (TESCAN, Mira 3 XMU) equipped with an In-Beam SE detector operating at 8 kV, and by energy dispersive spectrometry (EDS, EDAX) operating at 20 kV. Prior to the analysis the samples were coated with carbon using a Cressington 208C. The relative abundance of phosphorus atoms in the mixture was traced back to the percentage amount of CpG which was 7.36±0.720% w/w.

4. Characterization of the Prototype Nanoparticles

Figure 9:
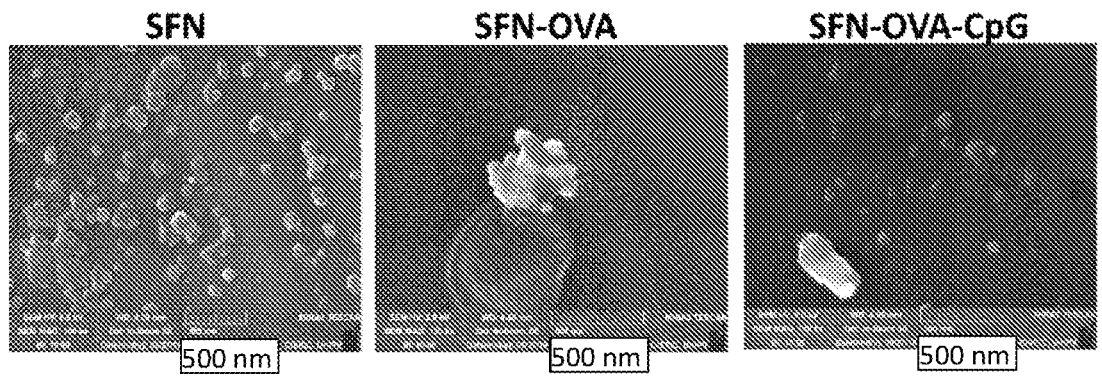
FIG. 9. Morphological analysis of the prototype nanoparticles under scanning electron microscopy, at two different magnifications (from left: 100 kx; 150 kx, 150 kx).

The morphological analysis conducted as in section 2. showed that the particles appear as spherical, small and mostly monodispersed, with the presence of some agglomerate (FIG. 9).

A dimensional distribution analysis was performed before and after filtration with 0.45 μm filter to confirm the presence of agglomerates. The dimensional distribution of the nanoparticle prototype was analysed by Nanoparticle Tracking Analysis technology using NanoSight NS300 equipment (Malvern Panalytical, Grovewood Rd, UK). The nanoparticles were dispersed in water, vortexed for 30 seconds, sonicated for 30 minutes. One aliquot was analysed as is, another aliquot was filtered with 0.45 μm filter and analysed. Five measurements of 90 seconds each were performed for each sample. Table 2 shows the values (in nm) of mean diameter, mode, $d_{10}$, $d_{50}$ and $d_{90}$ (mean±standard deviation, n=5).

TABLE 2

| Sample | Mean | Mode | $d_{10}$ | $d_{50}$ | $d_{90}$ |
| --- | --- | --- | --- | --- | --- |
| SFN unfiltered | 220.2 ± 3.6 | 78.3 ± 2.2 | 138.9 ± 2.1 | 204.6 ± 4.1 | 327.6 ± 6.6 |
| SFN filtered | 151.7 ± 3.0 | 103.5 ± 3.6 | 91.0 ± 1.9 | 136.6 ± 4.7 | 219.0 ± 6.4 |
| SFN-OVA unfiltered | 181.5 ± 5.0 | 135.0 ± 8.1 | 118.4 ± 4.5 | 159.4 ± 4.3 | 283.0 ± 5.9 |
| Filtered SFN-OVA | 141.1 ± 4.6 | 93.7 ± 3.1 | 78.9 ± 5.8 | 111.5 ± 4.1 | 228.7 ± 19.1 |

TABLE 2-continued

| Sample | Mean | Mode | $d_{10}$ | $d_{50}$ | $d_{90}$ |
|---|---|---|---|---|---|
| SFN-OVA-CpG unfiltered | 198.2 ± 11.2 | 133.8 ± 5.4 | 114.3 ± 4.6 | 177.8 ± 9.6 | 298.7 ± 21.7 |
| Filtered SFN-OVA-CpG | 134.4 ± 3.7 | 101.2 ± 7.9 | 74.0 ± 1.0 | 110.6 ± 2.6 | 212.5 ± 10.0 |

Comparing the nanoparticle sizes of the filtered and unfiltered samples, the presence of agglomerates is however limited. In order to reduce the formation of aggregates, prototypes of nanoparticle-based injectable formulations were prepared, as reported in section 5.

5. Injectable Formulations Based on Nanoparticles
5.1 Prototype Preparation

The procedures described in 2.1 were repeated and three different nanoparticle formulations were prepared:
  silk fibroin nanoparticles (SFNs);
  silk fibroin nanoparticles loaded with Ovalbumin (SFNs-OVA);
  silk fibroin nanoparticles loaded with Ovalbumin and CpG (SFNs-OVA-CpG).

SFNs: an SF solution (1.5% w/v) was added to acetone, resulting in nanoparticles being formed by solvent precipitation.

SFNs-OVA: a solution of SF (1% w/v) and OVA (0.5% w/v) was added to acetone, promoting the nanoparticle formation by solvent precipitation.

SFNs-OVA-CpG: the same procedure applied for the preparation of SFNs-OVA was adopted, starting from a solution comprising 1% (w/v) SF, 0.5% (w/v) OVA 25 and 0.1% (w/v) CpG.

The nanoparticle suspensions were dialysed (12 kDa MWCO) against deionized water for 72 hours. Mannitol was added to the aqueous suspensions thus obtained in order to improve the suspension in aqueous medium of the final preparation and were lyophilised at a pressure of $8\times10^{-1}$ mbar and at a temperature of $-50°$ for 72 hours to improve storage over time.

5.2 Characterization of the Nanoparticle-Based Injectable Formulations 5.2.1 Cake Appearance.

For each formulation, four vials were randomly selected and quality control was performed by visual inspection of the appearance of the cake. Following the evaporation of the aqueous solvent during lyophilization, a solid and porous cake was formed, free of defects. By addition of saline solution (0.9% w/v NaCl in water) the cake dissolves rapidly, generating a nanoparticle suspension that looks clear and free of subvisible particles.

5.2.2. Residual Humidity.

Determined by Coulometric Titrator HI904 (Hanna Instruments) after allowing the samples to rebalance at room temperature. The titration was performed twice for each vial (n=3 vials for each formulation). The residual humidity never exceeded 3%, indicating an effective lyophilization of the product that preserves the stability and effectiveness over time thereof.

5.2.3. Measurement of the Osmolarity of the Reconstitute

The osmolarity was measured using a microosmometer (Precision System Inc., Natick, MA) after reconstitution of 10 mg lyophilizate in 2 ml saline (0.9% w/v NaCl in water) at 37° C. For each formulation, the osmolarity value was always within the range required for injectable formulations (250-350 mOsm/Kg) and, in particular, always between 320 and 350 mOsm/Kg.

5.2.3 pH of the Reconstitute.

The pH of the reconstituted product was measured by pH-meter (Mettler-Toledo, US). For each formulation, the measured pH value was always in the range of 7.2 to 7.6.

5.2.4 Size Distribution

The size distribution of the nanoparticle prototypes was analysed by Nanoparticle Tracking Analysis technology using NanoSight NS300 equipment (Malvern Panalytical, Grovewood Rd, UK). The nanoparticles were dispersed in water, vortexed for 30 seconds, sonicated for 30 minutes filtered with 0.45 nm filter and analysed. Five measurements of 90 seconds each were performed for each sample. Table 3 shows the values (in nm) of mean diameter, mode, $d_{10}$, $d_{50}$ and $d_{90}$ (mean±standard deviation, n=5).

TABLE 3

| Sample | Mean | Mode | $d_{10}$ | $d_{50}$ | $d_{90}$ |
|---|---|---|---|---|---|
| SFNs | 165.8 ± 2.0 | 116.8 ± 2.7 | 112.7 ± 2.9 | 151.7 ± 2.2 | 237.9 ± 4.8 |
| SFNs-OVA | 204.3 ± 1.3 | 163.1 ± 2.0 | 138.4 ± 1.9 | 188.9 ± 2.0 | 296.2 ± 6.2 |
| SFNs-OVA-CpG | 169.2 ± 2.8 | 138.2 ± 5.3 | 110.1 ± 0.9 | 152.4 ± 3.9 | 256.2 ± 5.7 |

Comparing the values shown in Table 3 with those shown in Tables 1 and 2, it can be seen that the addition of mannitol to the nanoparticle suspension before lyophilization allowed to improve the re-suspendability of the finished product in aqueous media, preventing the formation of aggregates. The mean nanoparticle diameter values and the relative standard deviation are in fact lower than the values determined in the absence of mannitol.

5.2.5 Morphological Analysis Using Scanning Electron Microscopy (SEM)

Figure 10:
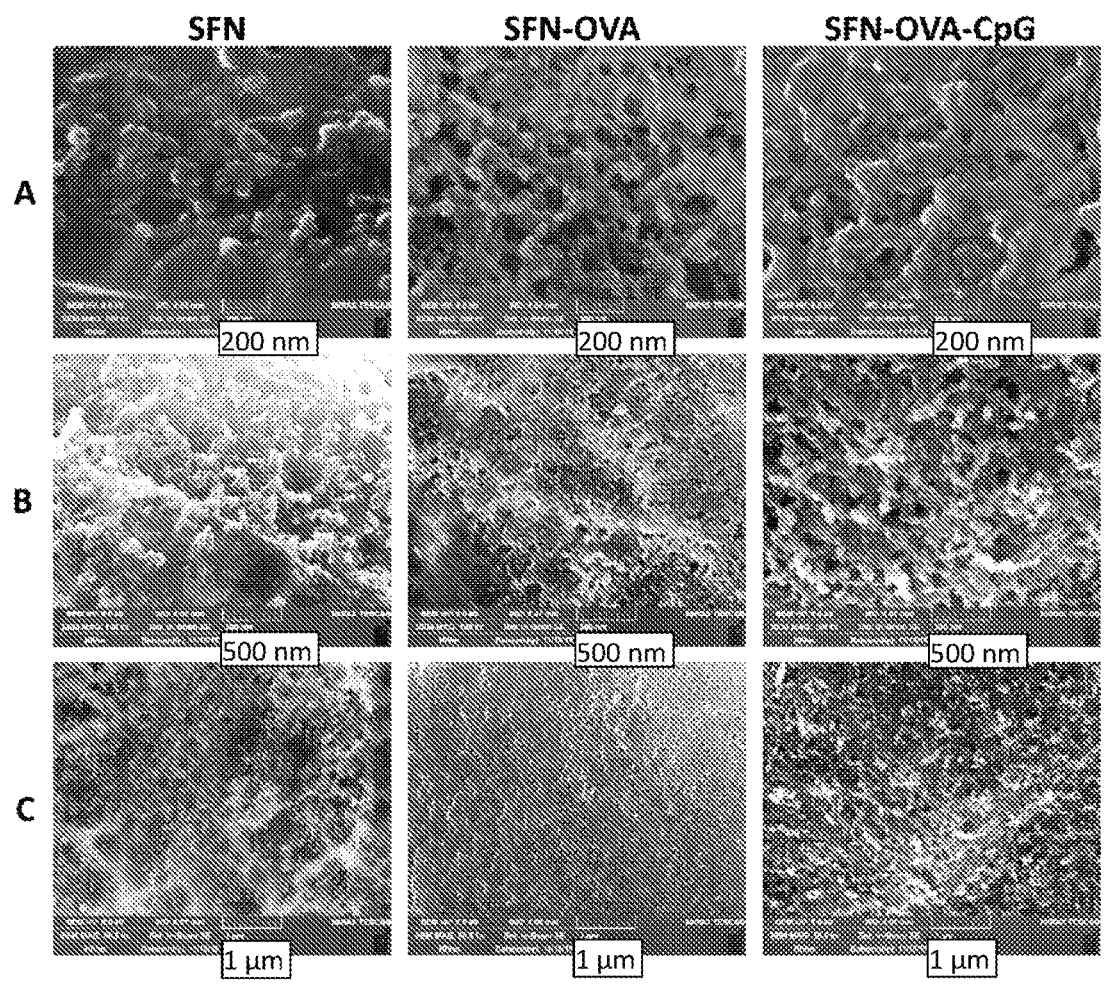
FIG. 10. Scanning electron microscope morphological analysis of the injectable formulations containing fibroin nanoparticles (SFN), SFN with Ovalbumin (SFN-OVA) and SFN-OVA with CpG (SFN-OVA-CpG) at three different magnifications (rows A: 200 kx, B: 100 kx and C: 50 kx).

The morphology of the injectable formulations containing nanoparticles was determined by a high-resolution electronic scanning microscope (TESCAN, Mira 3 XMU) equipped with an In-Beam SE detector operating at 8 kV. Prior to the analysis the samples were coated with carbon using a 25 Cressington 208C. FIG. 10 shows the morphological analysis of the formulations containing fibroin nanoparticles (SFN), fibroin and ovalbumin nanoparticles (SFN-OVA) and fibroin and ovalbumin and CpG nanoparticles (SFN-OVA-CpG) at three different magnifications (rows A, B and C). At all magnifications, and especially those of row C, a homogeneous matrix consisting of mannitol, in which the nanoparticles are immersed, can be clearly observed. During the analysis it is possible to clearly distinguish the mannitol (which burns due to the electron beam) from the nanoparticle systems which are instead more stable. At all magnifications, especially those of rows A and B, the particles appear as round, without the formation of obvious aggregates, and with a dimensional range between 100 and 200 nm, confirming the data obtained with the dimensional analysis. From the larger magnifications shown in row A, it can be seen that the surface of the nanoparticles appears smooth. Overall, the nanoparticle size, morphology and shape are optimal for uptake by cancer cells (Donahue et al. 2019, Concepts of nanoparticle cellular uptake, intracellular trafficking, and kinetics in nanomedicine, Advanced Drug Delivery Reviews, doi.org/10.1016/j.addr.2019.04.008).

6. Assessment of Therapeutic Efficacy In Vivo

Methodology: The prototypes consisting of SF, OVA and CpG described above (paragraphs 2-4) were used for in vivo testing purposes. Experiments were performed in two models of experimental neoplasm: 1) B16-F10 melanoma and 2) MB49 bladder cancer.

6.1 B16-F10 melanoma model

C57BL mice were initially hyper-immunized against OVA, mimicking the vaccination practice against microbial molecules traditionally carried out on the population for preventive purposes.

Seven-week old C57BL female mice were immunized subcutaneously with a suspension of ovalbumin (60 μg) and CpG (30 μg), dissolved in 100 μl saline phosphate buffer (PBS). Two subsequent boosters were administered 15 and 30 days after the first immunization.

Ten days after the last booster, B16-F10 mouse melanoma cells (105 cells/mouse) were administered subcutaneously to the mouse. Neoplastic nodules were seen at the injection site 7 days after tumour administration.

The mice were divided into 4 different groups that underwent different treatment protocols, as explained below:
GROUP 1: treated with SFNs-OVA-CpG;
GROUP 2: treated with SFNs-OVA;
GROUP 3: treated with SFNs (non-loaded nanoparticles);
GROUP 4: untreated.

The nanoparticular suspensions in PBS in an amount of 1 mg/ml were sonicated for 15-30 minutes and injected subcutaneously into the peri-tumoural zone (200 g per mouse).

Each mouse received a total of three nanoparticle injections, one week apart.

The mice and tumour size were observed daily.

Results.

The results of two independent experiments showed how the treatment with SFNs-OVA (FIG. 2) was effective based on tumour growth reduction ($p<0.0001$).

Figure 3:
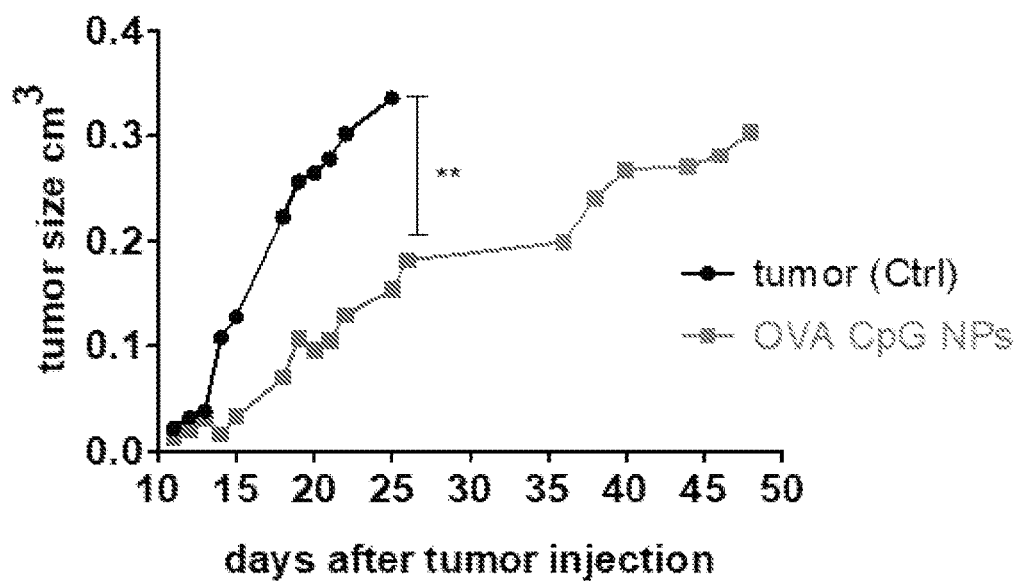
FIG. 3: Comparison of tumour size reduction trend over time (melanoma model B16F10) between Group 4 (tumour (Ctrl)) and Group 1, in which the mice were treated with silk fibroin nanoparticles loaded with Ovalbumin and CpG (OVA CpG SFNs).

Furthermore, the treatment with SFNs-OVA-CpG was significantly effective in reducing tumour growth ($p=0.006$) (FIG. 3).

Figure 4:
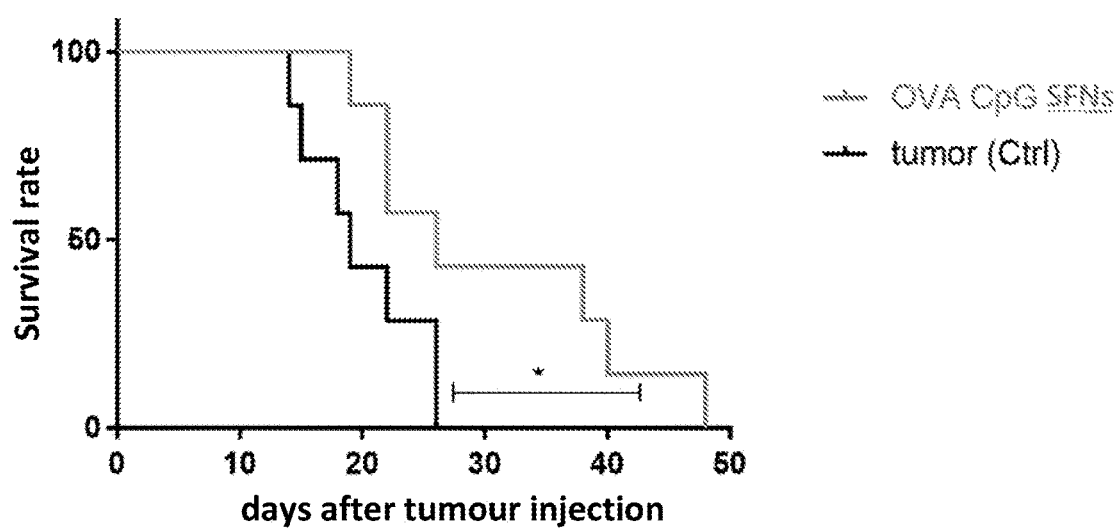
FIG. 4: Comparison of survival rate percentage over time between Group 1 (OVA CpG SFNs) and Group 4 mice (tumour (Ctrl) (melanoma model B16F10)).

In addition, the survival of the mice treated with SFNs-OVA-CpG was significantly greater with respect to the untreated mice ($p=0.04$) (FIG. 4).

6.2 MB49 Bladder Cancer Model

C57BL mice were initially hyper-immunized against OVA, mimicking the vaccination practice against microbial molecules traditionally carried out for vaccines for preventive purposes.

Seven-week old C57BL female mice were immunized subcutaneously with a suspension of ovalbumin (60 μg) and CpG (30 μg), dissolved in 100 μl saline phosphate buffer (PBS). Two subsequent boosters were administered 15 and 30 days after the first immunization.

Ten days after the last booster, MB49 mouse bladder cancer cells (105 cells/mouse) were administered subcutaneously to the mouse. Neoplastic nodules were seen at the injection site 7 days after tumour administration.

The mice were divided into 4 different groups that underwent different treatment protocols, as explained below:
GROUP 1: treated with SFNs-OVA-CpG;
GROUP 2: treated with SFNs-OVA;
GROUP 3: treated with SFNs (non-loaded nanoparticles);
GROUP 4: untreated.

The nanoparticular suspensions in PBS in an amount of 1 mg/ml were sonicated for 15-30 minutes and injected subcutaneously into the peri-tumoural zone (200 g per mouse).

Each mouse received a total of three nanoparticle injections, one week apart.

The mice and tumour size were observed daily.

Figure 5:
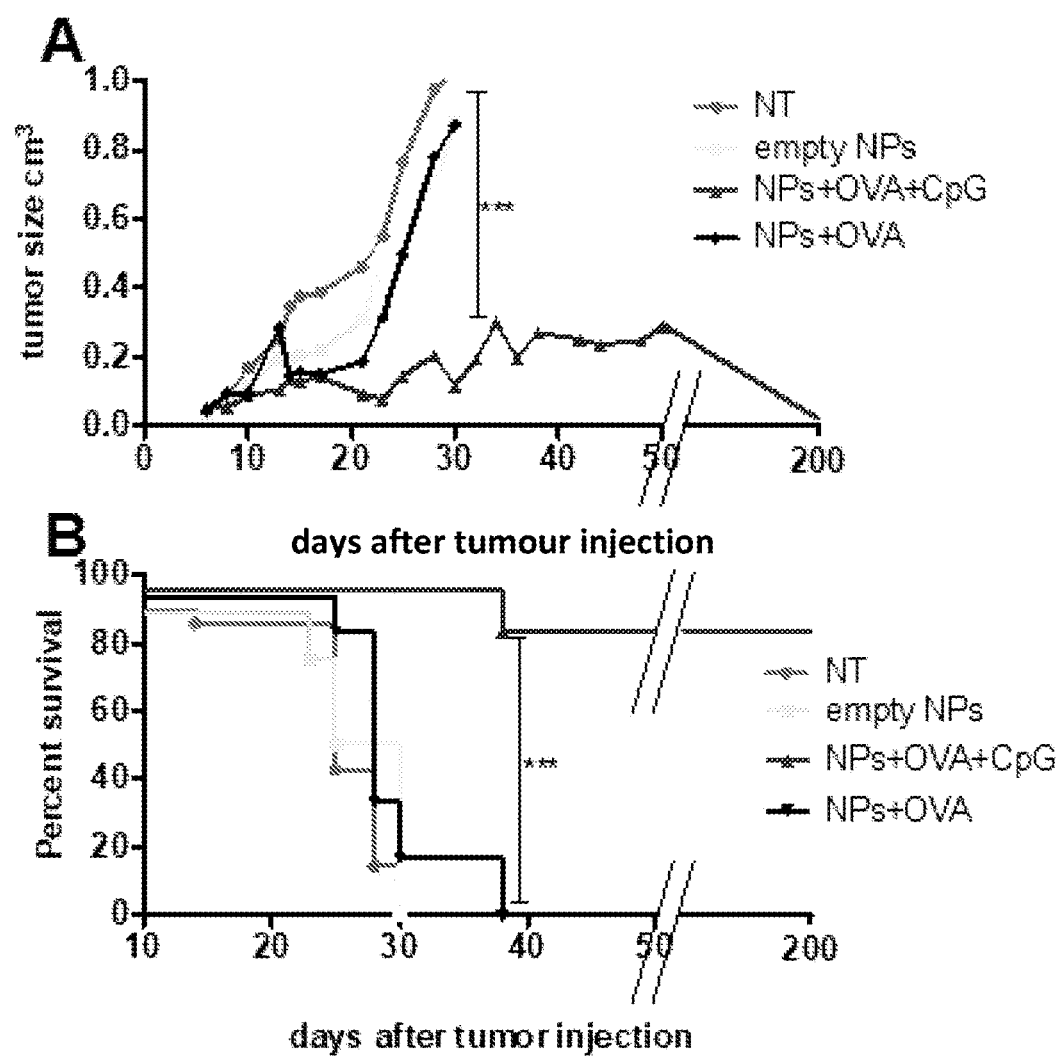
FIG. 5: A) Tumour Size Trend (MB49 bladder cancer model) after tumour injection, based on different treatment protocols (Day 20, in order from top to bottom: NT: not treated; empty NPs: non-loaded SFNs; NPs+OVA+CpG: treated with SFNs-OVA-CpG; NPs+OVA: treated with SFNs-OVA). B) Survival rate percentage after tumour injection, based on the same protocols as A) (Day 30, in order from top to bottom: NPs+OVA+CpG; empty NPs; NPs+OVA; NT).

Results:

The results of the experiment showed that treatment with SFNs-OVA-CpG was effective in reducing tumour growth ($p<0.0001$) (FIG. 5A); it is also interesting to note that 4 of the 5 mice treated with SFNs-OVA-CpG are still alive more than 200 days after the tumour inoculation, the latter SURPRISINGLY completely regressed (FIG. 5B).

7. Verification of Nanoparticle Redirection of Pre-Existing Anti-OVA Immune Response Towards the Tumour Site Functional tests to demonstrate OVA-specific T lymphocyte expansion following immunization were performed in order to demonstrate that the surprising healing of almost all the animals treated with intra-tumoural vector SFNs of the antigen OVA and adjuvant CpG was associated with the targeting of OVA-specific reactive T lymphocytes in the tumour micro-environment.

Figure 6:
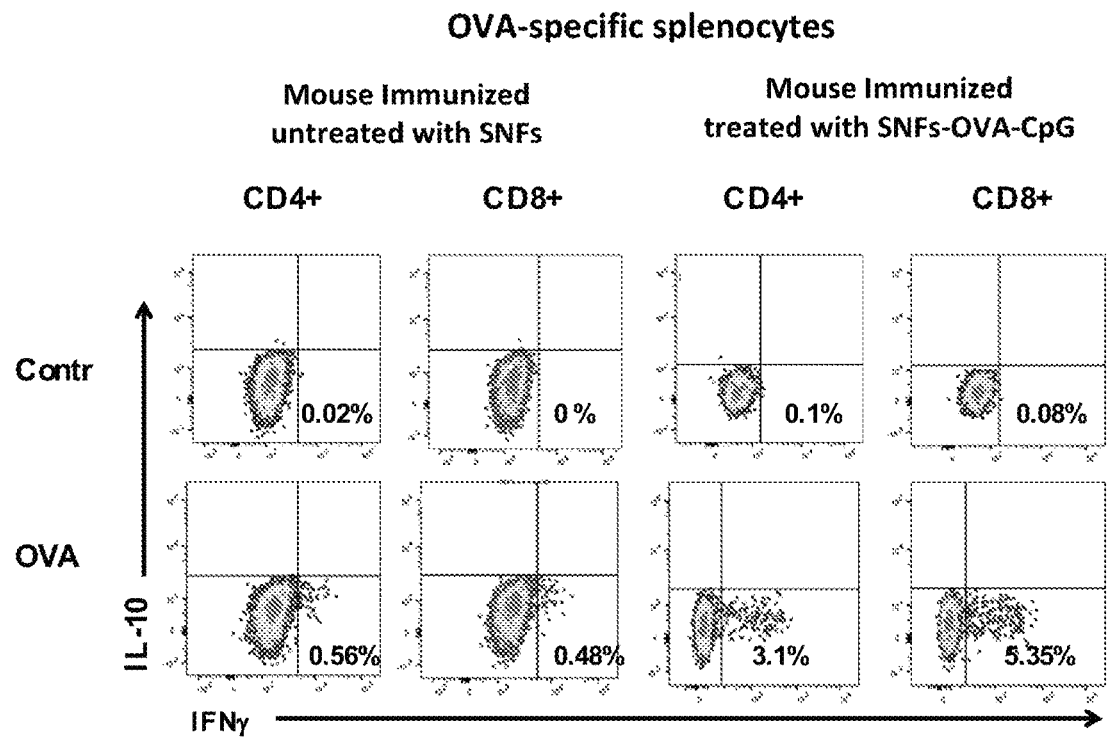
FIG. 6: Analysis of the frequency of IFNγ-positive CD4+ and CD8+ OVA-specific T lymphocytes in spleens of animals immunized to OVA, subjected to tumour challenge with MB49 bladder cancer cells and treated (right panels) or not (left panels) with intra-tumoural administration of SFNs-OVA-CpG. The top (CTRL) and bottom (OVA) panels show, respectively, the frequency of IFNγ+ cells in antigen-stimulated and unstimulated T cell cultures.

First, the frequency of T lymphocytes was analysed, both CD4+ and CD8+ OVA-specific capable of producing the IFNγ cytokine among the splenocytes of animals pre-immunized with OVA and subsequently subjected to tumour challenge with MB49 cells, as described above. For this purpose, the spleens of the animals were harvested to purify the T lymphocytes, which were re-suspended in culture medium and incubated for 24 hours in the presence or lack of OVA (10 μg/ml). At the end of incubation the cells were subjected to an intracytoplasmic staining protocol with fluorescent antibodies to highlight IL10 and IFNγ cytokine-secreting cells by flow cytometry. As expected, IFNγ-secreting CD4+ and CD8+ OVA-specific splenocytes were observed in such pre-immunized animals, the frequency of which was higher in animals treated with SFNs-OVA-CpG (FIG. 6). In the same experiment, the frequency of IL10-secreting OVA-specific T lymphocytes was negligible.

Figure 7:
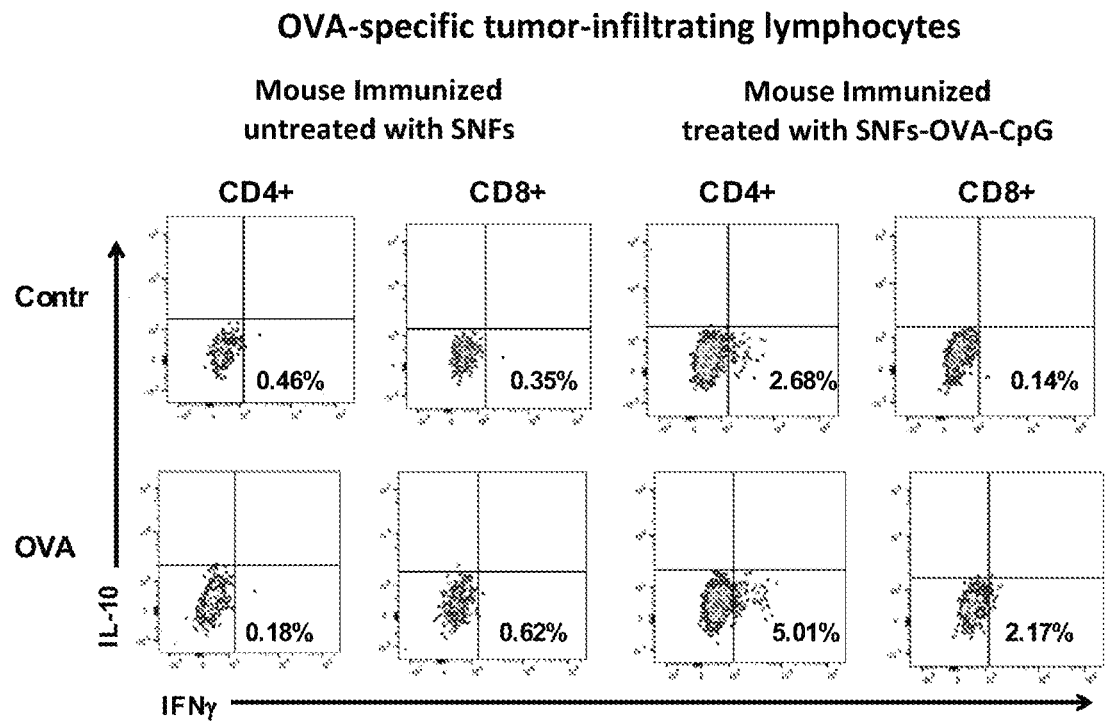
FIG. 7. Analysis of the frequency of IFN-γ-positive CD4+ and CD8+ OVA-specific T lymphocytes in the tumours of animals immunized to OVA, subjected to tumour challenge with MB49 bladder cancer cells and treated (right panels) or not (left panels) with intra-tumour administration of SFNs-OVA-CpG. The top (CTRL) and bottom (OVA) panels show, respectively, the frequency of IFNγ+ cells in antigen-stimulated and unstimulated cell cultures.

Subsequently, the analysis was replicated on tumour-purified T lymphocytes from animals immunized against OVA, subjected to tumour challenge with MB49 bladder cancer cells, and treated or not with intra-tumoural administration of SFNs-OVA-CpG. FIG. 7 shows the presence of a CD4+ and CD8+ OVA-specific IFN-γ secreting T lymphocyte infiltrate in the animal treated with SFNs-OVA-CpG but not in the untreated animal.

Figure 8:
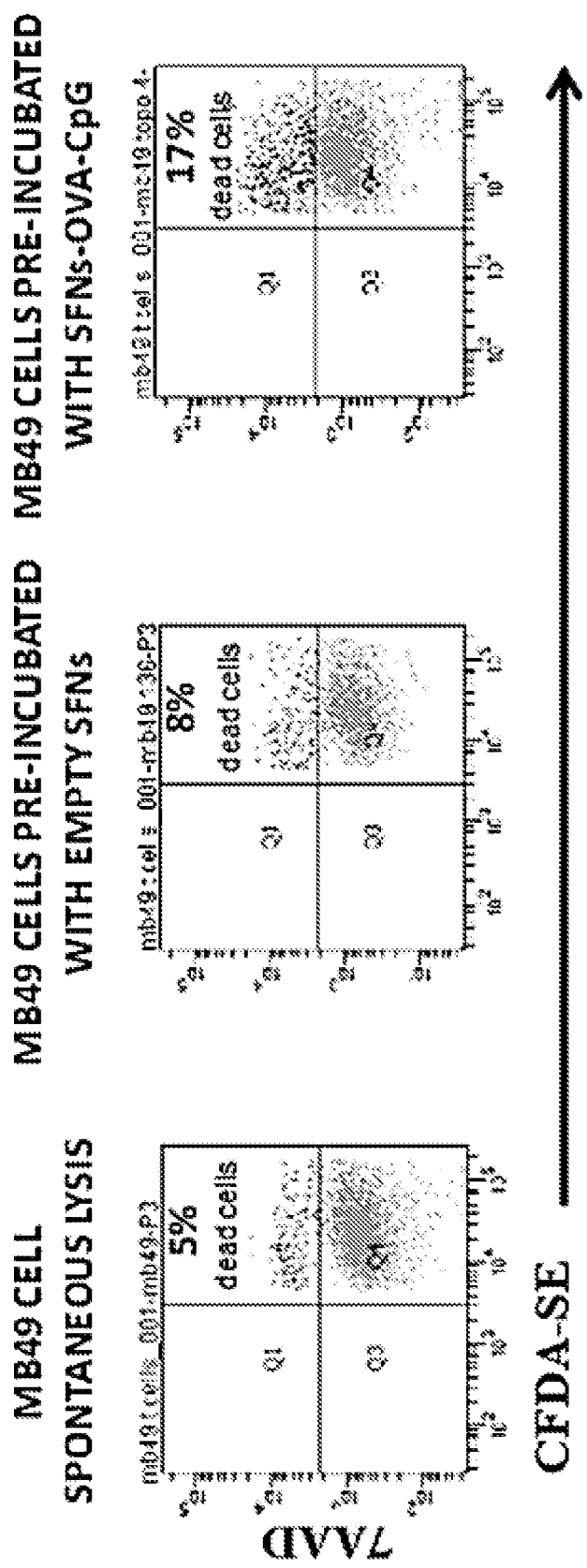
FIG. 8. Assessment of cytotoxic activity by flow cytometry of MB49 tumour-isolated intra-tumoural lymphocytes treated with non-loaded SFNs (central panel) or with SFNs-OVA-CpG (right panel). The left panel shows the spontaneous lysis of the cancer cells. The percentages indicated refer to the frequencies of MB49 cancer cells undergoing lysis compared to the total tumour population.

The second functional approach was focused on demonstrating the cytotoxic activity of the tumour-extracted lymphocytes of SFNs-OVA-CpG-treated animals against cancer cells, by flow cytometry. MB49 bladder cancer cells (the same tumour line used to induce cancer in the animals) were used as cell targets for this purpose and were labelled with CFDA-SE fluorescent dye to monitor the target cells. The lysis of the target cells was measured with the addition of vital dye 7AAD, as a percentage of the MB49 CFDA-SE+ 7AAD+ cells. For the cytotoxicity test, lymphocytes extracted from the tumour of animals treated with SFNs-OVA-CpG were incubated for 4-6 hours in the presence of fluorescent MB49 cells, pre-incubated in vitro or with depleted SFNs or with SFNs-OVA-CpG. FIG. 8 shows that the lysis induced by intra-tumour lymphocytes of the cancer cells incubated with SFNs-OVA-CpG (thus, containing the OVA antigen) (right panel) was more than double that induced by the same lymphocytes on the cancer cells incubated with non-loaded SFNs (thus, antigen-free) (central panel), and that the latter is comparable to the spontaneous lysis of such cells (left panel). The latter experiment showed that the lymphocytes extracted from the tumour of the animals treated with SFNs-OVA-CpG are capable of killing cancer cells in which the SFNs delivered the antigen (in this case OVA) against which the animal had previously been immunized, although this antigen is not expressed spontaneously and naturally by the tumour.

The invention claimed is:

1. A method for recalling against cancer cells an immune response specific to a non-tumour-specific antigen, the method comprising:
   administering nanoparticles for the delivery and targeting of an antigen in cancer cells to cancer patients who have a specific immunity for the non-tumour-specific antigen;
   the nanoparticles comprising
      a matrix support based on a biocompatible material, wherein the biocompatible material is selected from the group consisting of
      natural polymers, selected from the group consisting of hyaluronic acid, agar, alginate, starch, cellulose and its derivatives, chitosan, collagen, dextrins, fibroin, gelatine, pectin, pullulan, and their combinations thereof;

synthetic polymers, selected from the group consisting of polycaprolactone, polyethylene amine, poly-lactic-glycolic acid and their combinations thereof;
and their combinations thereof,
an antigen, being the non-tumour-specific antigen,
an adjuvant,
wherein
the specific immunity for the non-tumour-specific antigen is pre-existing to the tumour pathology.

2. The method according to claim 1, wherein the non-tumour-specific antigen is selected from the antigens selected from the group consisting of diphtheria toxoid (anti-diphtheria vaccine), tetanus toxoid (anti-tetanus vaccine), HBsAg (anti-viral hepatitis B vaccine), *Neisseria* Heparin Binding Antigen (NHBA), *Neisseria* adhesin A (NadA) and factor H binding protein (fHbp) of meningococcus B (anti-meningococcal vaccine B), and L1 proteins of papillomavirus (anti-HPV vaccine).

3. The method according to claim 1, wherein the adjuvant is selected from the group consisting of mineral salts, mineral oils, emulsions, liposomes, virosomes, oligonucleotides, toxins and cytokines.

4. The method according to claim 1, wherein the adjuvant is CpG (cytosine-phospho-guanine).

5. The method according to claim 1, wherein the biocompatible material is silk fibroin.

6. The method according to claim 1, wherein the nanoparticles are functionalized with agents promoting the internalization by cancer cells.

7. The method according to claim 1, wherein the antigen content is between 1% and 50% (w/w).

8. The method according to claim 1, wherein the adjuvant content is between 1% and 30% (w/w).

9. The method according to claim 1, wherein the biocompatible material a content is between 20% and 98% (w/w).

10. The method according to claim 1, wherein the nanoparticles have a numerical size distribution ranging from 1 nm to 1,000 nm.

11. The method according to claim 1, wherein the nanoparticles are included in solid or liquid pharmaceutical formulations, in combination with suitable excipients and/or diluents.

12. A method for treating cancer comprising treating subjects in need thereof with
chemotherapy, or
radiotherapy, or
a combination of chemotherapy and radiotherapy,
the method comprising administering nanoparticles for delivering and targeting an antigen in tumour cells, the nanoparticles comprising
a matrix support based on a biocompatible material, wherein the biocompatible material is selected from the group consisting of
natural polymers, selected from the group consisting of hyaluronic acid, agar, alginate, starch, cellulose and its derivatives, chitosan, collagen, dextrins, fibroin, gelatine, pectin, pullulan, and their combinations thereof;
synthetic polymers, selected from the group consisting of polycaprolactone, polyethylene amine, poly-lactic-glycolic acid and their combinations thereof;
and their combinations thereof,
an antigen, being a non-tumour-specific antigen, and
an adjuvant,
wherein
the subjects in need thereof are cancer patients who have a specific immunity for the non-tumour-specific antigen, said specific immunity for the non-tumour-specific antigen being pre-existing to the tumour pathology, and
the administering of the nanoparticles recalls an immune response specific to the non-tumour-specific antigen against the cancer cells.

13. The method according to claim 12,
wherein the nanoparticles are included in a kit further comprising
an anti-tumour vaccine delivering an antigen selected from a tumour-specific antigen, a tumour-associated antigen (TAA) and a neoantigen.

* * * * *

```
                          SEQUENCE LISTING

<160> NUMBER OF SEQ ID NOS: 7

<210> SEQ ID NO 1
<211> LENGTH: 20
<212> TYPE: DNA
<213> ORGANISM: Artificial Sequence
<220> FEATURE:
<223> OTHER INFORMATION: Murine B-class CpG oligodeoxyribonucleotide
      1826

<400> SEQUENCE: 1
tccatgacgt tcctgacgtt                                                   20

<210> SEQ ID NO 2
<211> LENGTH: 24
<212> TYPE: DNA
<213> ORGANISM: Artificial Sequence
<220> FEATURE:
<223> OTHER INFORMATION: Murine B-class CpG oligodeoxyribonucleotide
      2006

<400> SEQUENCE: 2
tcgtcgtttt gtcgttttgt cgtt                                              24

<210> SEQ ID NO 3
<211> LENGTH: 10
<212> TYPE: PRT
<213> ORGANISM: Artificial Sequence
<220> FEATURE:
<223> OTHER INFORMATION: CTL1
<300> PUBLICATION INFORMATION:
<301> AUTHORS: Nathan D. Donahue, Handan Acar, Stefan Wilhelma
<302> TITLE: Concepts of nanoparticle cellular uptake, intracellular
      trafficking, and kinetics in nanomedicine.
<303> JOURNAL: Advanced Drug Delivery Reviews.
<304> VOLUME: 143
<306> PAGES: 68-96
<307> DATE: 2019-04-22

<400> SEQUENCE: 3

Cys Gly Leu Ile Ile Gln Lys Asn Glu Cys
1               5                   10

<210> SEQ ID NO 4
<211> LENGTH: 5
<212> TYPE: PRT
<213> ORGANISM: Artificial Sequence
<220> FEATURE:
<223> OTHER INFORMATION: CREKA
<300> PUBLICATION INFORMATION:
<301> AUTHORS: Nathan D. Donahue, Handan Acar, Stefan Wilhelma
<302> TITLE: Concepts of nanoparticle cellular uptake, intracellular
      trafficking, and kinetics in nanomedicine.
<303> JOURNAL: Advanced Drug Delivery Reviews.
<304> VOLUME: 143
<306> PAGES: 68-96
<307> DATE: 2019-04-22

<400> SEQUENCE: 4

Cys Arg Glu Lys Ala
1               5

<210> SEQ ID NO 5
<211> LENGTH: 5
```

```
<212> TYPE: PRT
<213> ORGANISM: Artificial Sequence
<220> FEATURE:
<223> OTHER INFORMATION: Cyclic cRGDfk peptide
<300> PUBLICATION INFORMATION:
<301> AUTHORS: Mao, B.; Liu, C.; Zheng, W.; Li, X.; Ge, R.; Shen, H.;
      Guo, X.; Lian, Q.; Shen, X.; Li, C.,
<302> TITLE: Cyclic cRGDfk peptide and Chlorin e6 functionalized silk
      fibroin nanoparticles for targeted drug delivery and photodynamic
      therapy.
<303> JOURNAL: Biomaterials
<304> VOLUME: 161
<306> PAGES: 306-320
<307> DATE: 2018-02-03

<400> SEQUENCE: 5

Arg Gly Asp Phe Lys
1               5

<210> SEQ ID NO 6
<211> LENGTH: 12
<212> TYPE: PRT
<213> ORGANISM: Artificial Sequence
<220> FEATURE:
<223> OTHER INFORMATION: SP5-52 peptide
<300> PUBLICATION INFORMATION:
<301> AUTHORS: Mottaghitalab, F.; Kiani, M.; Farokhi, M.; Kundu, S. C.;
      Reis, R. L.; Gholami, M.; Burdock, H.; Dinarvand, R.; Geramifar,
      P.; Beild, D.; Atyabi, F.,
<302> TITLE: Targeted Delivery System Based on Gemcitabine-Loaded Silk
      Fibroin Nanoparticles for Lung Cancer Therapy.
<303> JOURNAL: Acs Applied Materials & Interfaces.
<304> VOLUME: 9
<305> ISSUE: 37
<306> PAGES: 31600-31611
<307> DATE: 2017-08-24

<400> SEQUENCE: 6

Ser Val Ser Val Gly Met Lys Pro Ser Pro Arg Pro
1               5                   10

<210> SEQ ID NO 7
<211> LENGTH: 9
<212> TYPE: PRT
<213> ORGANISM: Artificial Sequence
<220> FEATURE:
<223> OTHER INFORMATION: iRGD
<300> PUBLICATION INFORMATION:
<301> AUTHORS: Bian, X. Y.; Wu, P. Y.; Sha, H. Z.; Qian, H. Q.; Wang,
      Q.; Cheng, L.; Yang, Y.; Yang, M.; Liu, B. R.,
<302> TITLE: Anti-EGFR-iRGD recombinant protein conjugated silk fibroin
      nanoparticles for enhanced tumour targeting and antitumor
      efficiency.
<303> JOURNAL: Oncotargets and Therapy.
<304> VOLUME: 9
<306> PAGES: 3153-3162
<307> DATE: 2016-05-27

<400> SEQUENCE: 7

Cys Arg Gly Asp Lys Gly Pro Asp Cys
1               5
```